(12) United States Patent
Mitsuyoshi

(10) Patent No.: US 6,481,309 B2
(45) Date of Patent: Nov. 19, 2002

(54) TRANSFER ARM

(75) Inventor: Toshihiko Mitsuyoshi, Fukuyama (JP)

(73) Assignee: JEL Corporation, Fukuyama (JP)

( * ) Notice: Subject to any disclaimer, the term of this patent is extended or adjusted under 35 U.S.C. 154(b) by 0 days.

(21) Appl. No.: 09/739,400

(22) Filed: Dec. 19, 2000

(65) Prior Publication Data
US 2001/0004852 A1 Jun. 28, 2001

(30) Foreign Application Priority Data

Dec. 22, 1999 (JP) .............................. 11-364370
Jun. 15, 2000 (JP) ........................... 2000-179737
Oct. 31, 2000 (JP) ........................... 2000-332033

(51) Int. Cl.$^7$ ............................................. B25J 18/00
(52) U.S. Cl. ...................... 74/490.01; 414/917; 901/19
(58) Field of Search ............................ 74/103, 490.01; 414/917; 901/19

(56) References Cited

U.S. PATENT DOCUMENTS

| | | | | |
|---|---|---|---|---|
| 4,530,637 A | * | 7/1985 | Mason et al. ............ | 198/468.4 |
| 5,158,423 A | * | 10/1992 | Liljengren et al. ...... | 198/750.11 |
| 5,520,502 A | * | 5/1996 | Liljengren et al. ....... | 414/751.1 |

* cited by examiner

Primary Examiner—David Fenstermacher
(74) Attorney, Agent, or Firm—Kanesaka & Takeuchi

(57) ABSTRACT

A transfer arm is formed of a first short link, a first parallel link pivotally connected to the first short link, a second short link pivotally connected to the other ends of the first parallel link, a second parallel link pivotally connected to the second short link, and a third short link pivotally connected to the second parallel link. A linear guide is integrally formed with the first short element to extend in a direction perpendicular to the first short link. One link element of the second parallel link extends and is linearly slidably attached to the linear guide. A holding plate is connected to the third short link to be moved linearly according to a rotation of a drive shaft connected to the first parallel link while deforming parallelograms formed by the first and second parallel lines.

4 Claims, 31 Drawing Sheets

TRANSFER ARM

BACKGROUND OF THE INVENTION

1. Field of the Invention

The present invention relates to a transfer arm, employed in a semiconductor processing system or the like, which is capable of accurately transferring substrates and which has excellent durability and thus long life.

2. Description of the Prior Art

Generally employed in a semiconductor processing system is a substrate transfer apparatus for transferring target substrates such as semiconductor wafers by predetermined sequence control. Such a substrate transfer apparatus is required to operate with its high accurate movement in a clean operational environment where airborne particles such as dust do not exist.

FIG. 27 is a schematic structural view schematically showing the structure and the operation of conventional transfer arms of a substrate transfer apparatus (see Japanese Patent No. 2808826). In the transfer apparatus, transfer arms shown in FIG. 27 each comprise two pairs of parallel link elements (two parallel links) connected by a common short link element allowing the folding and stretching of the arm. The folding and stretching of the arm achieves linear reciprocating motion of a substrate holder to transfer a substrate (not shown) in the longitudinal direction. To prevent occurrence of interference between the pairs of parallel link elements, one pair of parallel link elements are disposed at a level different from the level of the other pair of parallel link elements. The two transfer arms are arranged symmetrically relative to the center line. By this structure, continuous transfer is achieved.

As shown in FIG. 27, in a conventional mechanism of the transfer apparatus 500, articulated arms 520, 530 are arranged symmetrically relative to a center line C. Each of the arms 520, 530 comprises a linkage in which a parallel link 540 has link elements 541, 542 as long link elements, a parallel link 550 has link elements 551, 552 as long link elements, and two gears 570, 572 engaging each other compose a short link element common to both the parallel link 540 and the parallel link 550. The gear 570 is fixed to the link element 542 and the gear 572 is fixed to the link element 552.

A short link element 543 for the link elements 541, 542 at the opposite side of the common short link element is mounted on a rotary stand 510 as a drive. A substrate holder 590 is disposed on a short link element 553 connected to the other ends of the link elements 551, 552.

In the transfer apparatus 500 structured as mentioned above, the arm 530 is shown in its initial state. As the parallel link 540 is swung by rotation of a rotary shaft R50. Because of the engagement of the gears 570 and 572, the parallel link 550 is swung in a direction opposite to and at the same angle as the swing motion of the parallel link 540. As a result, the arm 520 in the right half of FIG. 27 linearly moves the substrate holder 590 in the direction of arrow A along the center line C, while increasing the angle of a V shape formed between the two parallel links after passing the position on the rotary shaft R50.

Instead of the two gears 570, 572 composing the short link element, a pulley belt or a wire may be employed as a mechanism for the folding and stretching of the arm composed of the two parallel links.

However, since gears to be engaged should be designed to have a predetermined backlash between them, the linkage easily rattles during the movement. This reduces the precision of transfer, so there is a problem that high precision of positioning can not be expected. There is also another problem that powders are produced by the grinding between teeth of the gears. On the other hand, in a conventional example in which the synchronization in moving angle is achieved by pulleys and a steel belt or a wire wound around the pulleys, there is a possibility of early causing of fatigue failure because the folding of the belt or wire is frequently repeated for being wound onto the pulleys. The life of the belt or wire is defined by the tension and the fold radius when the belt or wire is wound. For this, increase in the diameter of the pulley to be employed is considered as one of solving means. However, in this case, increase of the diameter of the pulley makes it difficult to miniaturize the apparatus as a whole.

In case where substrates are processed under high temperature condition, the belt or wire should be early deformed and deteriorated, so there is also a problem of durability.

Therefore, the first object of the present invention is to provide a transfer arm which can solve the aforementioned problems of the prior art, which is capable of accurately transferring substrates, and which has excellent durability because the wearing of components can be minimized.

The second object of the present invention is to provide a transfer arm which can solve the aforementioned problems of the prior art, which is capable of accurately transferring substrates under high temperature condition, and which has excellent durability because the wearing of components can be minimized.

SUMMARY OF THE INVENTION

For achieving the above first object, the present invention provides, as a first embodiment (described later), a transfer arm having a first parallel link and a second parallel link which are connected to each other by a common short link element, a drive shaft at an end of a link element of said first parallel link, and a holding plate disposed on the free end of said second parallel link which is linearly moved according to the rotation of said drive shaft while deforming parallelograms formed by the link elements of said first parallel link and formed by the link elements of said second parallel link, said transfer arm being characterized by comprising a linear guide having a guide rail disposed on a base between said first parallel link and said second parallel link to extend in a direction perpendicular to said common short link, and a synchronous link for connecting a slider which is slidable on said guide rail, articular shafts supporting the ends of link elements of said first parallel link, and articular shafts supporting the ends of link elements of said second parallel link which are arranged symmetrically relative to said linear guide.

It is preferable that said slider of said linear guide is linearly moved by the swing motion of the link element(s) of the first parallel link, and the link elements of the second parallel link are swung in a direction opposite to and at the same angle as the swing motion of the link elements of said first parallel link via said synchronous link according to the linear movement of said slider, whereby the holding plate disposed on the free end of said second parallel link is linearly moved while varying the angle formed between the link elements of said first parallel link and the link elements of said second parallel link.

It is preferable that said transfer arms are arranged to be opposed to each other relative to a center line parallel to the direction of transferring said holding plate, whereby subject objects are continuously transferred by alternatively operating the folding and stretching of said transfer arms.

It is preferable that said pair of transfer arms comprise two drive shafts which are coaxially arranged to allow independent folding and stretching operation of the respective transfer arms.

The present invention provides a transfer arm comprising two drive shafts coaxially arranged one of which is connected to an end of a link element of a quadrate link and the other one of which is connected to an end of another link element of the quadrate link which is symmetrical relative to a center line, a linear guide which is positioned at a joint of the other ends of the link elements at a location opposite to the location of said drive shaft, and a synchronous link which is arranged between a slider of said linear guide and portions near the ends of said link elements which are opposite to the ends connected to said joint.

In this case, it is preferable that said joint of the link elements of said quadrate link is linearly moved along said center line by turning said two drive shafts in the opposite directions at the same angular rate.

In addition, the entire of said quadrate link can be swung at a predetermined angle about said drive shaft by turning said two drive shafts in the same direction at the same angular rate.

The transfer arm of the present invention which can accomplish the first object exhibits effects of accurately transferring substrates and keeping clean operational environment because of little wearing of components so as to obtain excellent durability.

For achieving the above second object, the present invention provides, as from second to forth embodiments (described later), a transfer arm having a first parallel link and a second parallel link which are connected to each other by a common short link element, a drive shaft at an end of a link element of said first parallel link, and a holding plate disposed on the free end of said second parallel link which is linearly moved according to the rotation of said drive shaft while deforming parallelograms formed by the link elements of said first parallel link and formed by the link elements of said second parallel link, said transfer arm being characterized by comprising a linear guide extending in a direction perpendicular to a short link element including said drive shaft, wherein one of the link element of said second parallel link has an extension, which end is rotatably connected to a slider which linearly moves along the linear guide.

It is preferable that said linear guide has an end fixed to a base plate functioning as said common short link element.

It is preferable that said linear guide has an end fixed to an intermediate plate disposed to said first parallel link in parallel with said short link element of said first parallel link.

A transfer arm is having a lever having an end connected to a drive shaft, a parallel link composed of two link elements and two short link elements, the other end of said lever being connected to a middle point of one of said link elements, and a holding rod disposed on one of said short link elements, wherein said holding rod is linearly moved in a predetermined transferring direction via said lever while transforming parallelograms formed by the link elements of said parallel link, said transfer arm being characterized by further comprising a linear guide extending in a direction perpendicular to the transferring direction of said holding rod, and a slider which linearly moves along said linear guide, wherein said slider and a portion of the other one of said short link elements are formed as one unit.

It is preferable that said lever length is a half of the length of the link element of said parallel link and said lever is connected to the center in the longitudinal direction of said link element of said parallel link.

The present invention also provides a transfer arm having a first parallel link and a second parallel link which are connected to each other by a common short link element, a drive shaft at an end of a link element of said first parallel link, and a holding plate disposed on the free end of said second parallel link which is linearly moved according to the rotation of said drive shaft while deforming parallelograms formed by the link elements of said first parallel link and formed by the link elements of said second parallel link, said transfer arm being characterized by comprising linear guides which extend in a direction perpendicular to a short link element including said drive shaft and are arranged symmetrically relative to said drive shaft, a guide rod of which one end is connected to an intermediate position of said second parallel link, and a rod which is connected to an intermediate position of said guide rod and extends in parallel with the link elements of said second parallel link, wherein the other end of said guide rod is rotatably connected to one of sliders which linearly move along said linear guides and an end of said rod is rotatably connected to the other one of the sliders so as to form isosceles-triangular links which are arranged symmetrically relative to said drive shaft and of which summits are composed of a common point at the drive shaft and base sides are said linear guides, respectively.

It is also preferable that, instead of the isosceles-triangular links, the transfer arm being characterized by comprising a linear guide extending in a direction perpendicular to a short link element including said drive shaft and a guide rod of which one end is connected to a portion of the link element of said second parallel link, wherein the other end of said guide rod is rotatably connected to a slider which linearly moves along the linear guide so as to form a rhombic link which includes, as its component sides, a portion of said guide rod and a portion of the link element of said first parallel link of which opposite summits are an arthrosis including said drive shaft and a rotary joint of said slider.

The transfer arm of the present invention which can accomplish the second object exhibits effects of accurately transferring substrates and keeping clean operational environment because of little wearing of components so as to obtain excellent durability. Since all of components can be heat resisting members, the transfer arm of the present invention can be used under high temperature condition. Further, since bearings with solid lubricant are used for the respective arthroses, the transfer arm can be used under ultra-high vacuum condition.

DETAILED DESCRIPTION OF THE PREFERRED EMBODIMENTS

Figure 1A:
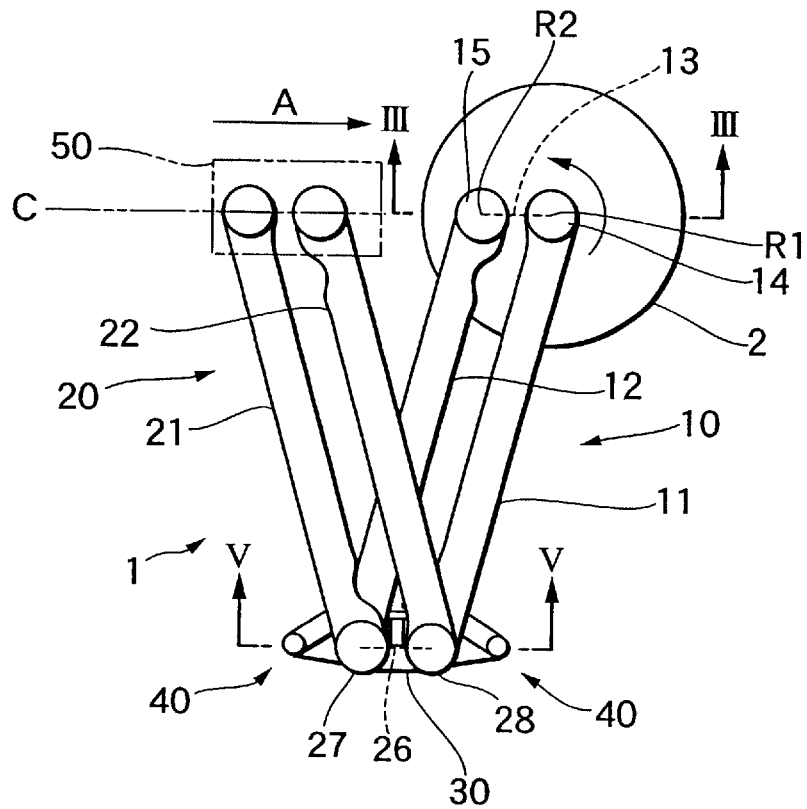
FIG. 1A and FIG. 1B are plan views showing a transfer arm of a first embodiment according to the present invention (in its original position: in the state where the arm is folded)
Figure 1B:
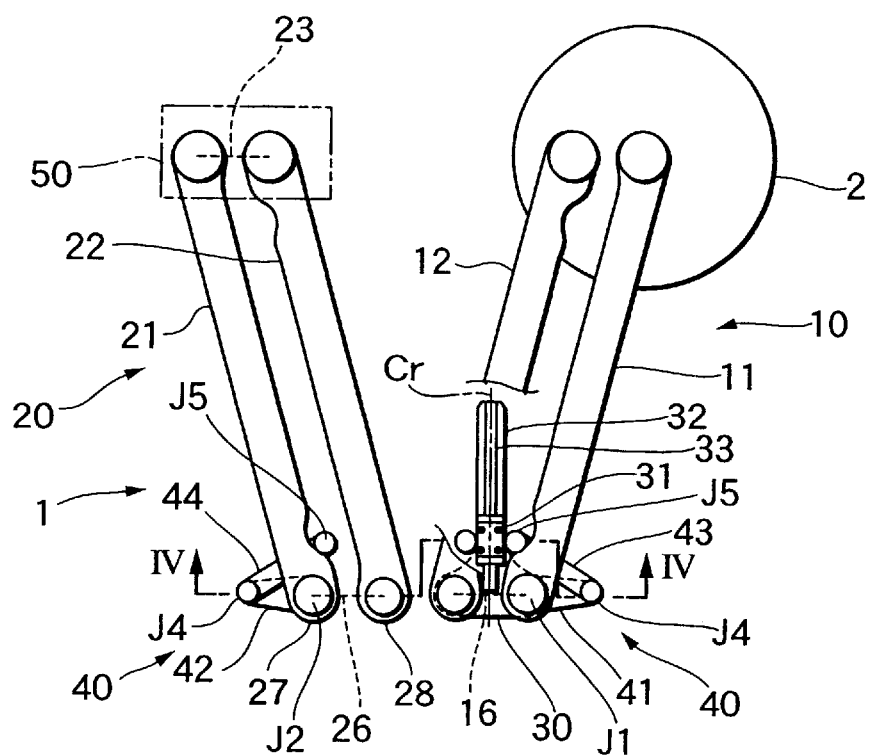

With reference to the accompanying drawings, a first embodiment of a transfer arm according to the present invention will be described. FIG. 1A is a plan view showing the entire of a transfer arm 1 supported by rotary shafts R1, R2 of a base plate 2. FIG. 1B is a plan view similar to FIG. 1A, but with a link element 12 being partially cut-out for explaining the operational state of a synchronous link (as described later) when the arm is in the folded state. The transfer arm 1 comprises two parallel links 10, 20 connected by a common short link element in the same manner as the known transfer arm using two parallel links.

That is, the transfer arm 1 comprises a first parallel link 10, a guide base 30, a linear guide 32, a second parallel link 20, a synchronous link 40, and a holding plate 50. The first parallel link 10 has two link elements 11, 12 arranged in parallel to each other. One of arthroses 14 of a short link element 13 connecting the link elements 11 and 12 is a drive shaft R1 and the other arthrosis 15 is a driven shaft R2. The link elements 11, 12 are swung about the drive shaft R1 and the driven shaft R2 by the rotation of the drive shaft R1. The guide base 30 includes the other short link element 16 at the opposite side of the short link element 13. The linear guide 32 is fixed to the guide base 30 for linearly guiding the guide base 30 in a direction perpendicular to the short link element 16 by the linear travel of a slider 31. The second parallel link 20 has the short link element 26 common to the first parallel link 10 through the guide base 30 and two link elements 11, 12 arranged in parallel to each other which are connected to both arthroses 27, 28 of the short link element 26, respectively. The synchronous link 40 comprises a first articular shaft J1 and a second articular shaft J2 which correspond to articular shafts J5 of the slider 31 of the linear guide 32, two pairs of levers (described later), and articular shafts J4, wherein the first articular shaft J1 and the second articular shaft J2 are connected via the levers and the articular shafts J4 such that they are arranged symmetrically relative to a center line Cr of the linear guide 32. According to this structure of the synchronous link 40, the swing motion of the link element 11 of the first parallel link 10 causes the linear movement of the slider 31 of the linear guide 32. This linear movement of the slider 31 causes the swing motion of the link element 21 of the second parallel link 20 in a direction opposite to and at the same angle as the swing motion of the link element 11. The holding plate 50 comprises a short link element 23 at a free end of the second parallel link 20 at the side opposite to the guide base 30 and holds a subject such as a substrate not shown thereon.

Hereinafter, description will now be made as regard to the structures of the arthroses and the elements joined by the arthroses of the transfer arm 1.

Figure 3:
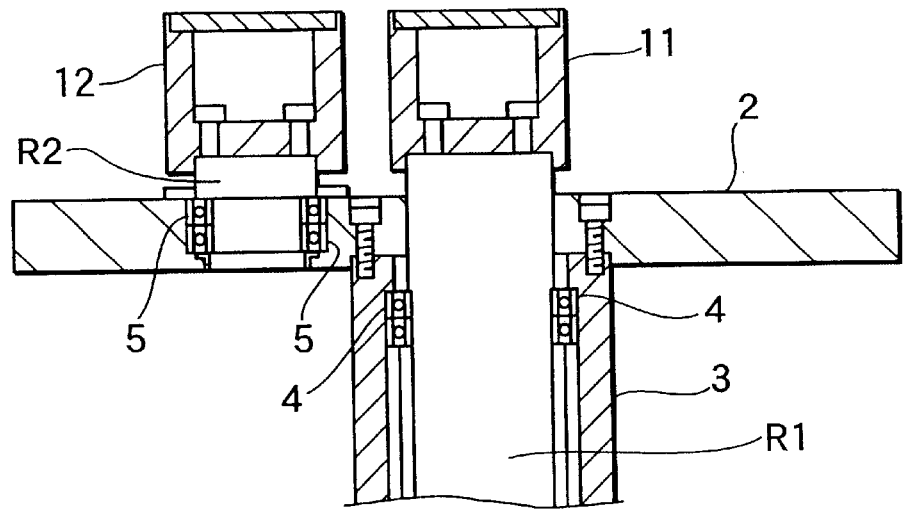
FIG. 3 is a sectional view taken along a line III—III of FIG. 1A where a driving shaft is illustrated.

The structure for attaching the first parallel link 10 to a base will be described with reference to FIG. 1A, FIG. 1B, and FIG. 3. FIG. 1A is a plan view showing the transfer arm 1 in its original position. As shown in this figure, the transfer arm composed of the two parallel links 10, 20 joined by the guide base 30 is in the fully folded state.

As shown in FIG. 1A, the transfer arm 1 is supported on the base plate 2 via the two arthroses 14, 15 as ends of the short link element 13 at one end of the first parallel link 10. The base plate 2 is in a disc shape when seen from the top and is fixed to the top of a cylindrical casing 3 by bolts as shown in FIG. 3. The drive shaft R1 driven by a motor (not shown) is supported by a ball bearing 4 and is housed in the cylindrical casing 3. One end of the link element 11 of the first parallel link 10 is bolted to the upper end of the drive shaft RI so as to compose the arthrosis 14. The driven shaft R2 is supported on the base plate 2 by a ball bearing 5. One end of the link element 12 of the first parallel link 10 is bolted to the upper end of the driven shaft R2 so as to compose the other arthrosis 15 of the short link element 13.

Figure 4:
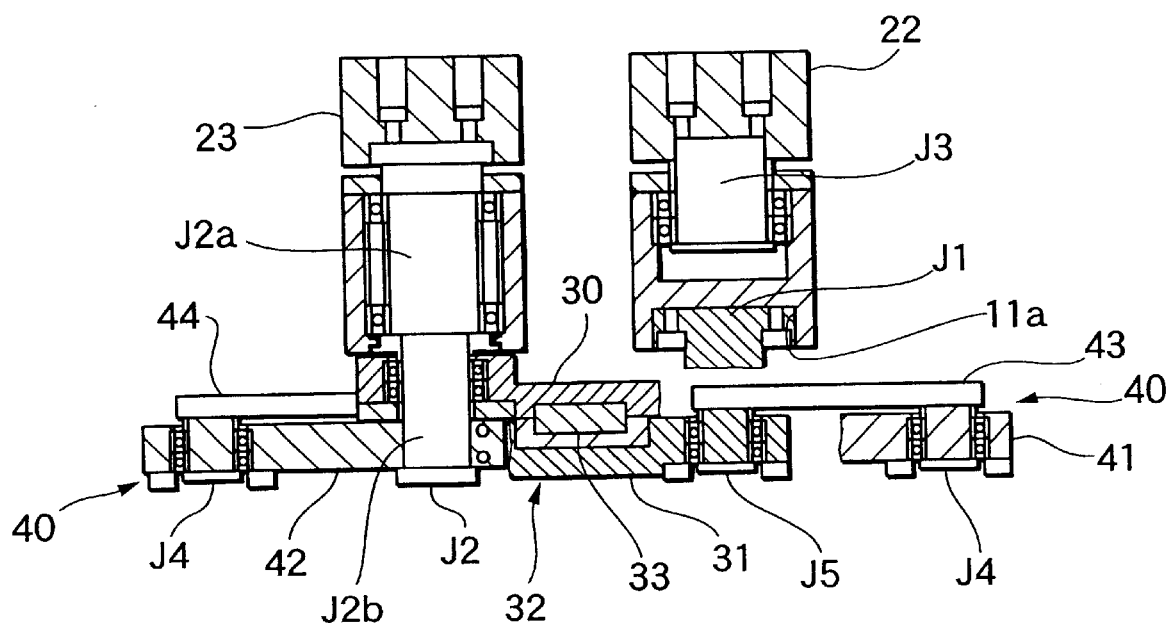
FIG. 4 is a sectional view taken along a line IV—IV of FIG. 1B where articular shafts of a synchronous link are illustrated.
Figure 5:
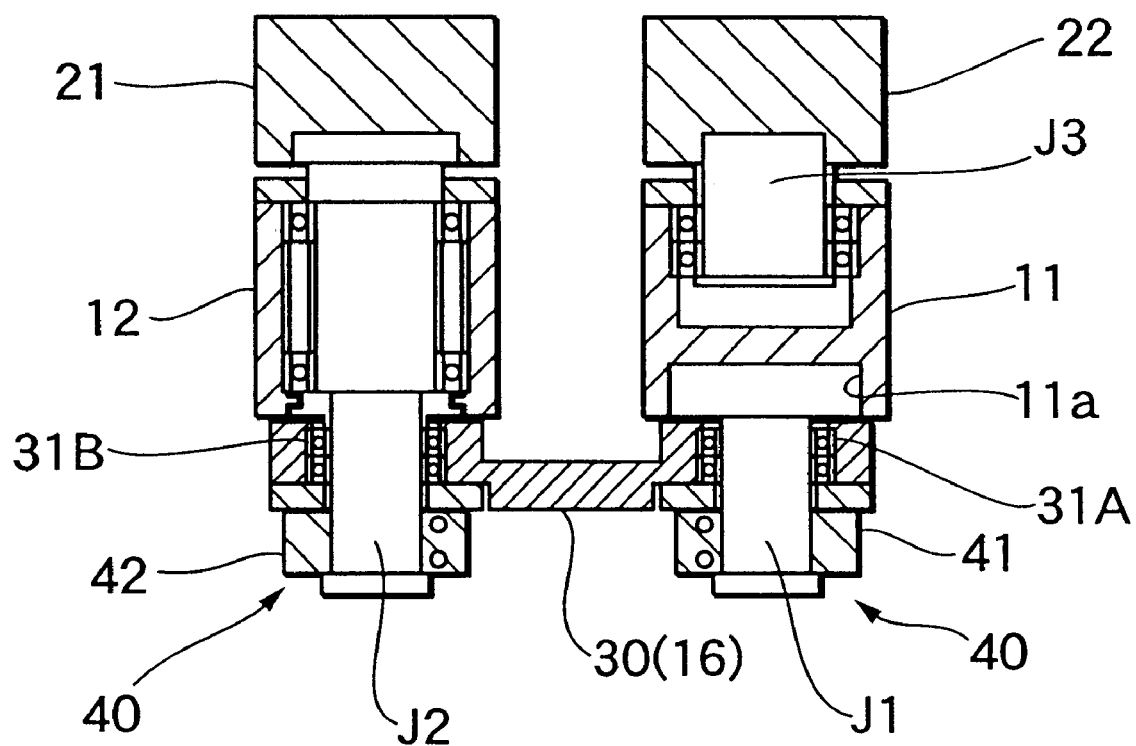
FIG. 5 is a sectional view taken along a line V—V of FIG. 1A where the articular shafts of the synchronous link are illustrated.

The structure of the joint between the parallel links 10, 20 will be described with reference to FIG. 1B, FIG. 4, and FIG. 5. The upper end of the first articular shaft J1 is fitted in a concavity 11a (FIG. 4) formed in a lower portion of the end of the link element 11 and is fixed by bolts. As shown in FIG. 5, the guide base 30 is attached to the first articular shaft J1 via a ball bearing 31A. Fixed to the lower end of the first articular shaft J1 is an end of a first lever 41 as a component of the synchronous link 40. On the other hand, an end of the link element 12 is supported to the second articular shaft J2 via a ball bearing. The second articular shaft J2 is positioned to penetrate the end of the link element 12 and has a large diameter portion J2a and a small diameter portion J2b. The other end area of the guide base 30 is attached to the small diameter portion J2b via a ball bearing 31B in the same manner as the link element 11 (see FIG. 5). The guide base 30 connects the first articular shaft J1 and the second articular shaft J2, as shown in FIG. 5, so as to compose a short link element 16 of the first parallel link 10. As shown in FIG. 4, a guide rail 33 of the linear guide 32 is fixed to the lower surface of the guide base 30 by bolts not shown. As shown in FIG. 1B, the guide rail 33 is disposed to the guide base 30 to extend in a symmetry line Cr perpendicular to a virtual line (parallel to the direction of movement of the holding plate) connecting the first articular shaft J1 and the second articular shaft J2. Fixed to the lower end of the second articular shaft J2 is an end of a first lever 42 as a component of the synchronous link 40.

Figure 2A:
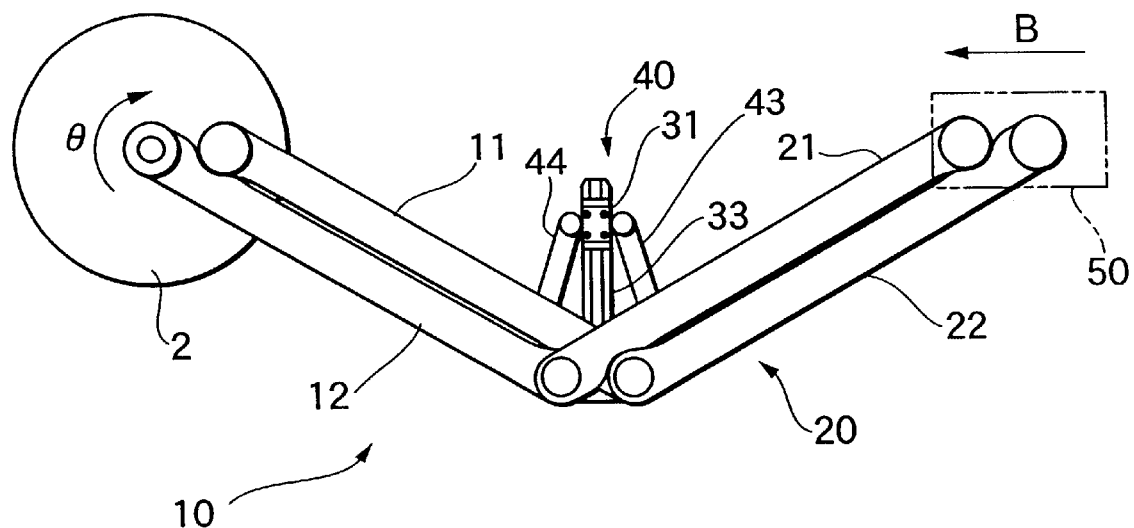
FIG. 2A and FIG. 2B are plan views showing the transfer arm shown in FIGS. 1A, 1B in the state where the arm is stretched.
Figure 2B:
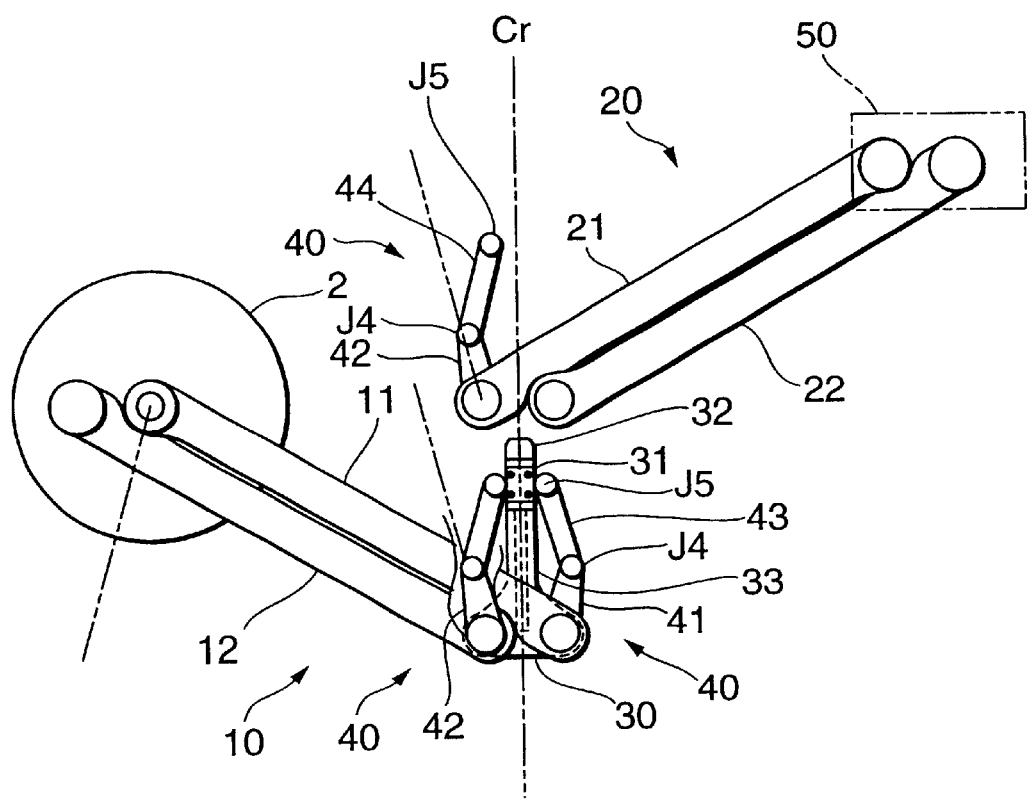

The structure of lever group composing the synchronous link 40 will be described with reference to FIG. 1B, FIG. 2B, and FIG. 4. As shown in FIG. 4, the synchronous link 40 comprises the slider 31 mounted slidably along the guide rail 33 attached to the lower surface of the guide base 30, the first levers 41, 42 connected to the lower ends of the first articular shaft J1 and the second articular shaft J2, respectively, and second levers 43, 44, each one end being joined to each of the first levers 41, 42 via the articular shafts J4, and the other ends being joined to sides of the slider 31 via the articular shaft J5. The pair of first levers 41, 42 and the pair of second levers 43, 44 of the synchronous link 40 are arranged symmetrically relative to the symmetry line Cr and keep symmetric relation in their forms during their folding and stretching according to the movement of the slider 31. That is, as shown in FIG. 2A, the slider 31 slides on the guide rail 33 in a direction apart from the first articular shaft J1 and the second articular shaft J2 during transferring a substrate. It should be noted that the first parallel link 10 and the second parallel link 20 are separated and the lever group of the first parallel link 10 is duplicated in FIG. 2B for explanation.

Hereinafter, the movement of the transfer arm as mentioned above will be described with reference to FIG. 1A through FIG. 2B. As the drive shaft R1 is turned in a direction of arrow (in the counterclockwise direction) at an angle θ from the original position shown in FIG. 1A, the link element 12 of the first parallel link 10 is swung in the same direction at the same angle θ through the link element 11 directly connected to the drive shaft R1. During this, the guide base 30 attached to the ends of the link elements 11, 12 moves while keeping the relation parallel to a virtual line C like a short side of a parallelogram. The first lever 41 fixed to the end of the link element 11 is swung in the counter-clockwise direction at the angle θ according to the swing motion of the link element 11. However, the end of the second lever 43 joined to the end of the first lever 41 via the articular shaft J4 is joined to the slider 31 on the guide rail 33 of the linear guide 32 via the articular shaft J5 so that the moving direction of the second lever 43 is restricted by the linear guide 32. Accordingly, the swing motion of the first lever 41 at the angle θ is converted to linear movement of the slider 31 along the linear guide 32 via the articular shaft J5 at the end of the second lever 43. At the symmetrical position of the articular shaft J5 connected to the second lever 43 relative to the symmetry line Cr, the articular shaft J5 connected to the second lever 44 of the synchronous link 40 is positioned. The extension of the second lever 44 and the first lever 42 connected to the second lever 44 is converted to rotation of the second articular shaft J2 at the angle θ in the clockwise direction. Since the link element 21 of the second parallel link 20 is connected to the second articular shaft J2 not to allow the relative rotation, rotation of the angle θ in the clockwise direction is applied to the link element 21. Since the link element 22 is rotatably connected to the third articular shaft J3 and the other ends of the link elements 21, 22 are rotatably connected to the holding plate 50 through articular shafts (not shown), the second parallel link 20 as a whole is swung in the clockwise direction at the angle θ about the first articular shaft J1 and the second articular shaft J2 as the respective pivots of the link elements 21, 22. As a result of this, the holding plate 50 linearly moves in a direction of arrow A along the virtual line C as shown in FIG. 1A.

From the above description and FIG. 2A, it should be understood that the holding plate 50 linearly moves in a direction of arrow B by turning the drive shaft R1 in the clockwise direction at a predetermined angle θ. Though the above description is made for the movement according to the rotation of the drive shaft R1 disposed at the base plate 2, the base plate 2 may have a rotational shaft (not shown) about which the base plate 2 can rotate. In this case, the transfer arm 1 can achieve compound movement by mixing the rotation of the base plate 2 and the linear movement of the holding plate 50. It should be understood that the configuration of the base plate 2 is not limited to the disc shape as illustrated and the base plate 2. Also it should be understood that the original position of the holding plate 50 and the fully stretched position of the arm can be freely suitably set according to the specification of an apparatus to be applied.

Figure 6:
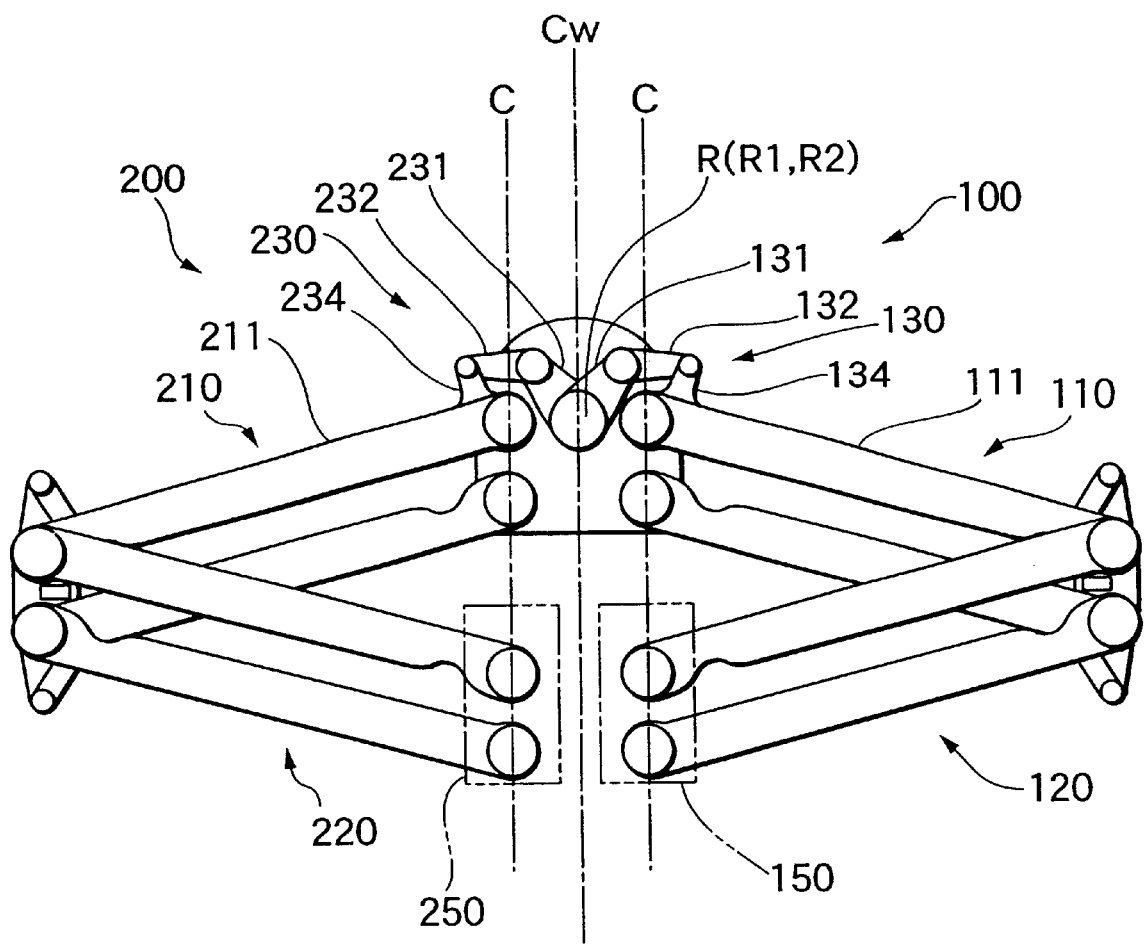
FIG. 6 is a plan view of a variation of transfer arms according to the present invention (in its original position: in the state where the arms are folded)
Figure 7:
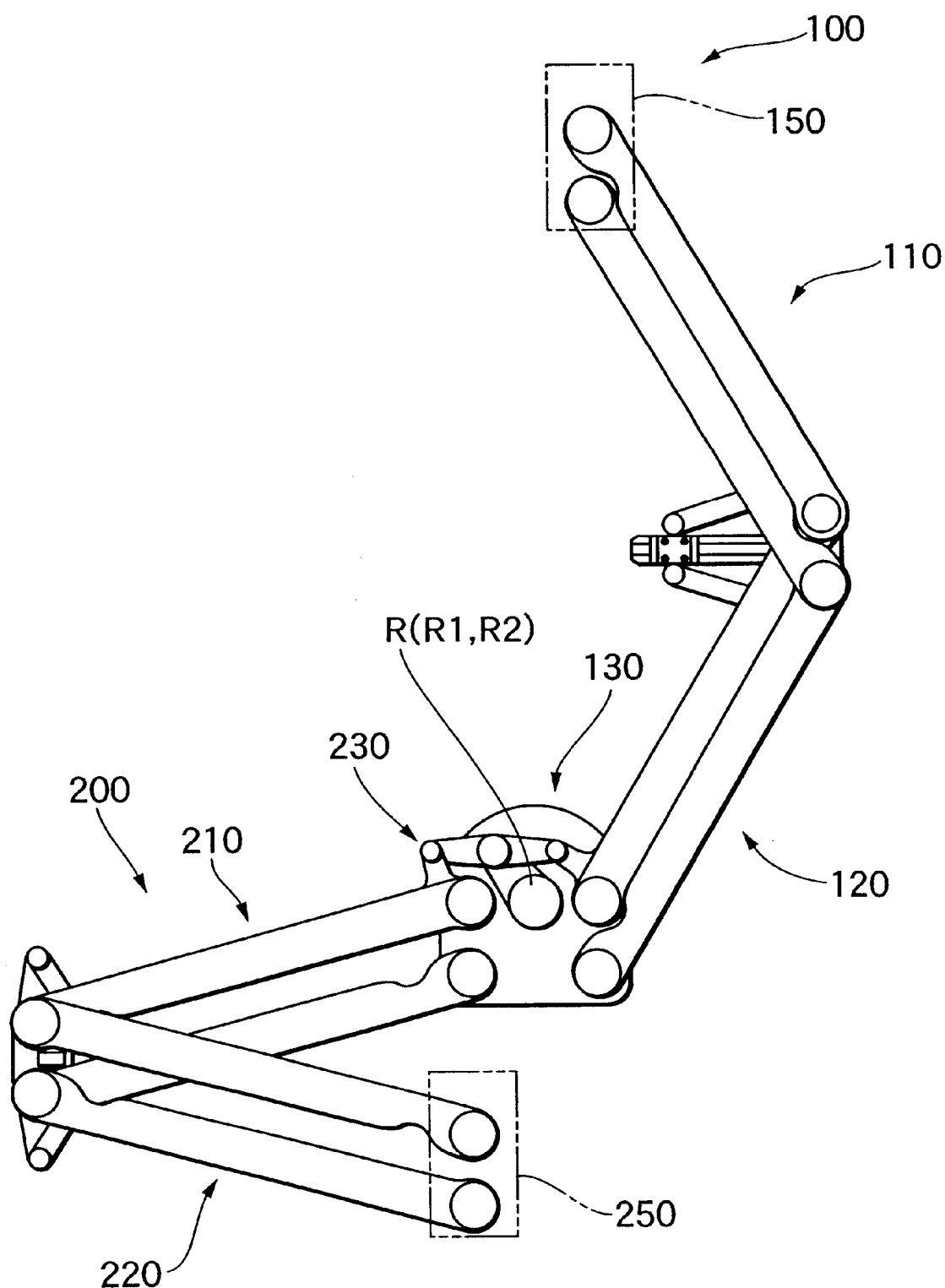
FIG. 7 is a plan view showing the stretched state of one of the transfer arms shown in FIG. 6.

FIG. 6 and FIG. 7 show the plane layout of a double arm transfer mechanism comprising two drive shafts R1, R2 as independent drive shafts which are coaxially arranged allowing the independent operation, in which two transfer arms are arranged symmetrically relative to a center line Cw with the respective drive shafts R1, R2. In this double arm mechanism, two transfer arms 100, 200 can be operated separately. As shown in FIG. 6 and FIG. 7, this mechanism includes output links 130, 230 incorporated between the drive shafts R1, R2 and the respective parallel links 110, 210 for transmitting the rotation of the drive shafts R1, R2 to link elements of the parallel links 110, 210. The output links 130, 230 comprise output levers 131, 231 connected to the drive shafts R1, R2, intermediate levers 132, 232 rotatably connected to ends of the output levers 131, 231, and input levers 134, 234 which are positioned near ends of link elements 111, 211 of the parallel links 110, 210 and of which ends are rotatably connected to the intermediate levers 132, 232, respectively. The drive shafts R1, R2 can be operated to change their directions to separately operate the arms 100, 200 at a predetermined angle through the output links 130, 230, thereby separately moving holding plates 150, 152 to linearly reciprocate along- a virtual line C. That is, by alternately and continuously operating the two drive shafts R1, R2, transfer movements between the original points and the fully stretched positions of the transfer arms 100, 200 can be achieved continuously. FIG. 7 shows a state in which the linear movement of the holding plate 150 is achieved by the stretching of the transfer arm 100. The stretching and folding mechanism of the transfer arm is completely the same as that of the transfer arm shown in FIGS. 1A, 1B and FIGS. 2A, 2B.

Figure 8:
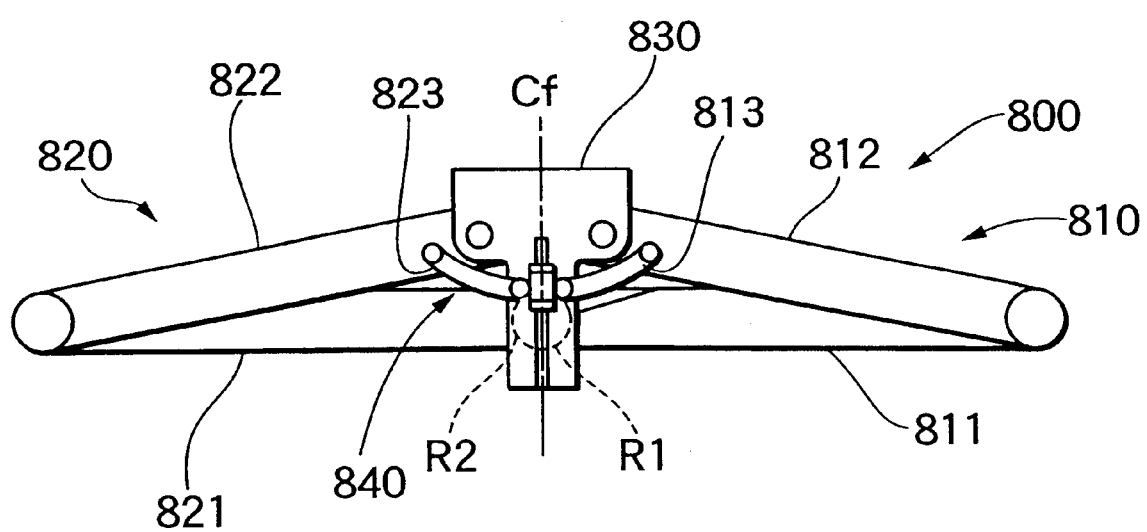
FIG. 8 is a plan view of another variation of transfer arms according to the present invention (in its original position: in the state where the arms are folded)

With reference to FIG. 8 and FIG. 9, description will be now made as regard to the structure and the movement of a transfer arm 800 having an irregular rhombic linkage shape and using a linear guide as a synchronous link.

As shown in FIG. 8, the transfer arm 800 in the original state is in an irregular quadrate shape which is symmetrical relative to a center line Cf. The transfer arm 800 is structured such that the holding plate (not shown) attached to an end of the arm can linearly move according to the stretching of a quadrate link. The transfer arm 800 includes a linear guide 832 as a synchronous link 830 to keep symmetric relation relative to the center line Cf in the folding and stretching forms of articulated arms 810, 820.

The transfer arm 800 has drive shafts R1, R2 arranged coaxially to each other. Connected to the drive shaft R1 is an end of a link element 811 and connected to the drive shaft R2 is an end of a link element 821. Therefore, the rotations of the drive shafts R1, R2 are transmitted to the link elements 811, 821, respectively. The drive shafts R1, R2 can be controlled by a control unit (not shown) to rotate in opposite directions at the same angle or in the same direction at the same angle. Ends of link elements 812, 822 are rotatably connected to the other ends of the link elements 812, 821 via an articular shaft J6 to form a symmetrical shape relative to the center line Cf. Disposed on the other ends of the link elements 812, 822 is a guide plate 830 formed in a T-like shape which is symmetrical relative to the center line Cf. The other ends of the link elements 812, 822 are connected to a flange 831 of the guide plate 830 at symmetrical positions. The linear guide 832 having a guide rail 833 is disposed on the guide plate 830 so that the direction of the rail 833 coincides with the center line Cf. A slider 831 is mounted on the guide rail 833 slidably in a direction of the rail 833. The slider 831 is provided at its sides with arthroses J7, J8 integrally formed with the slider 831 and synchronous levers 813, 823 which extend between the slider 831 and the link elements 812, 822 via the arthroses J7, J8 and are connected to portions near ends of the link elements 812, 822. In the structure as mentioned above, all of the articular shafts and arthroses are connected rotatably about axes perpendicular to the paper of FIG. 8.

Figure 9A:
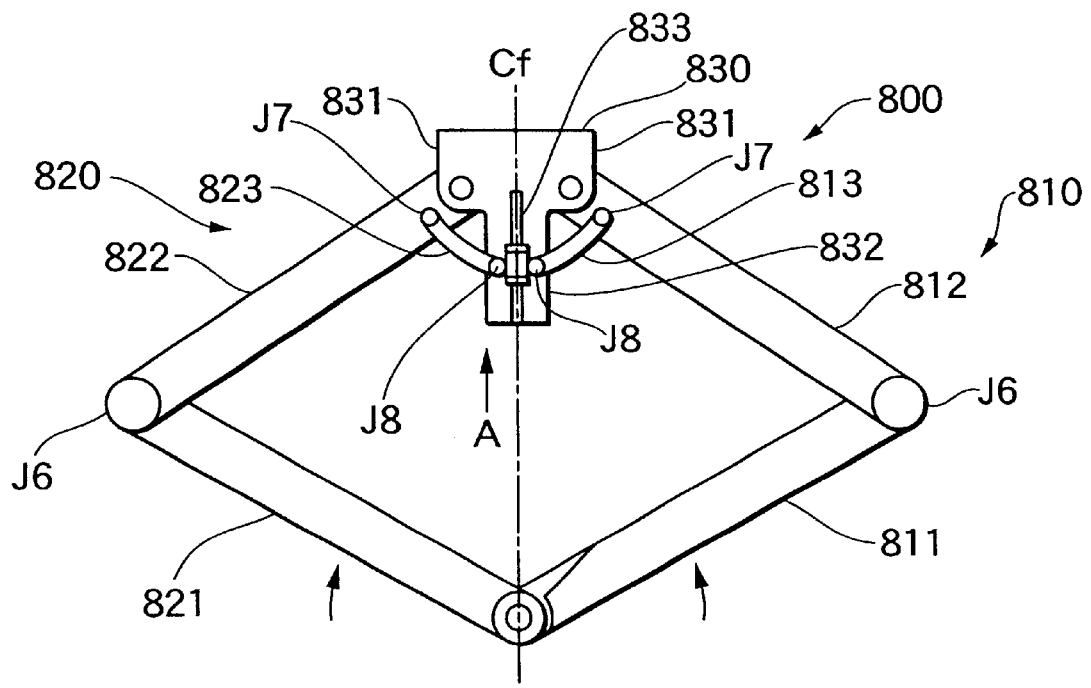
FIG. 9A and FIG. 9B are plan views showing the stretched state of the transfer arms shown in FIG. 8.
Figure 9B:
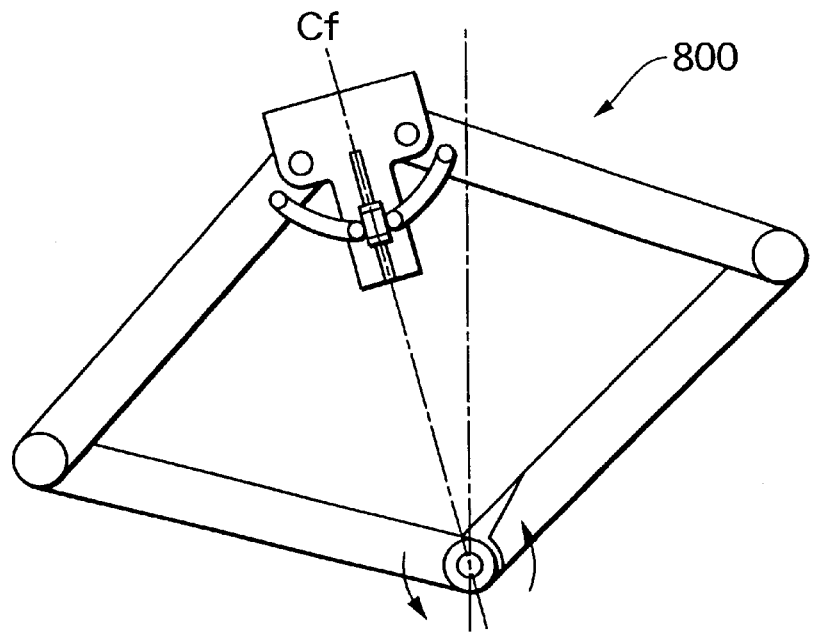

The movement of the transfer arm 800 structured as mentioned above will be described. As shown in FIG. 9A, the rotation of the drive shaft R1 in the clockwise direction at an angle θ synchronizes the drive shaft R2 to rotate in the counterclockwise direction at the angle θ. As a result of this, the link elements 811, 821 are swung in opposite directions at the angle θ to confront to each other. According to this swing motions of the link elements 811, 821, the slider 831 of the linear guide 832 on the guide plate 830 connected to the ends of the link elements 812, 822 slides in a direction toward the drive shafts R, in such a manner that the angles between the link elements 812, 822 and the center line Cf are decreased. That is, the guide plate 830 linearly moves in a direction of arrow A. Since the guide plate 830 can function as a holding plate (not shown), the linear movement of the holding plate according to the rotation of the drive shafts R can be achieved. On the other hand, by turning the drive shafts R1, R2 in the same direction at the same angle from the stretched state shown in FIG. 9A, the transfer arm 800 as a whole is tilted at a predetermined angle while keeping its quadrate shape as shown in FIG. 9B. By mixing the rotational movement as mentioned above, a wide transferring range for subjects can be ensured by the transfer arm 800.

Among the components mentioned above, the linear guide may be of any structural type known in the art according to the demanded precision. Though the ball bearings are employed for allowing the rotation of the respective arthroses in this embodiment, radial bearings of any structural type may be employed.

Figure 10:
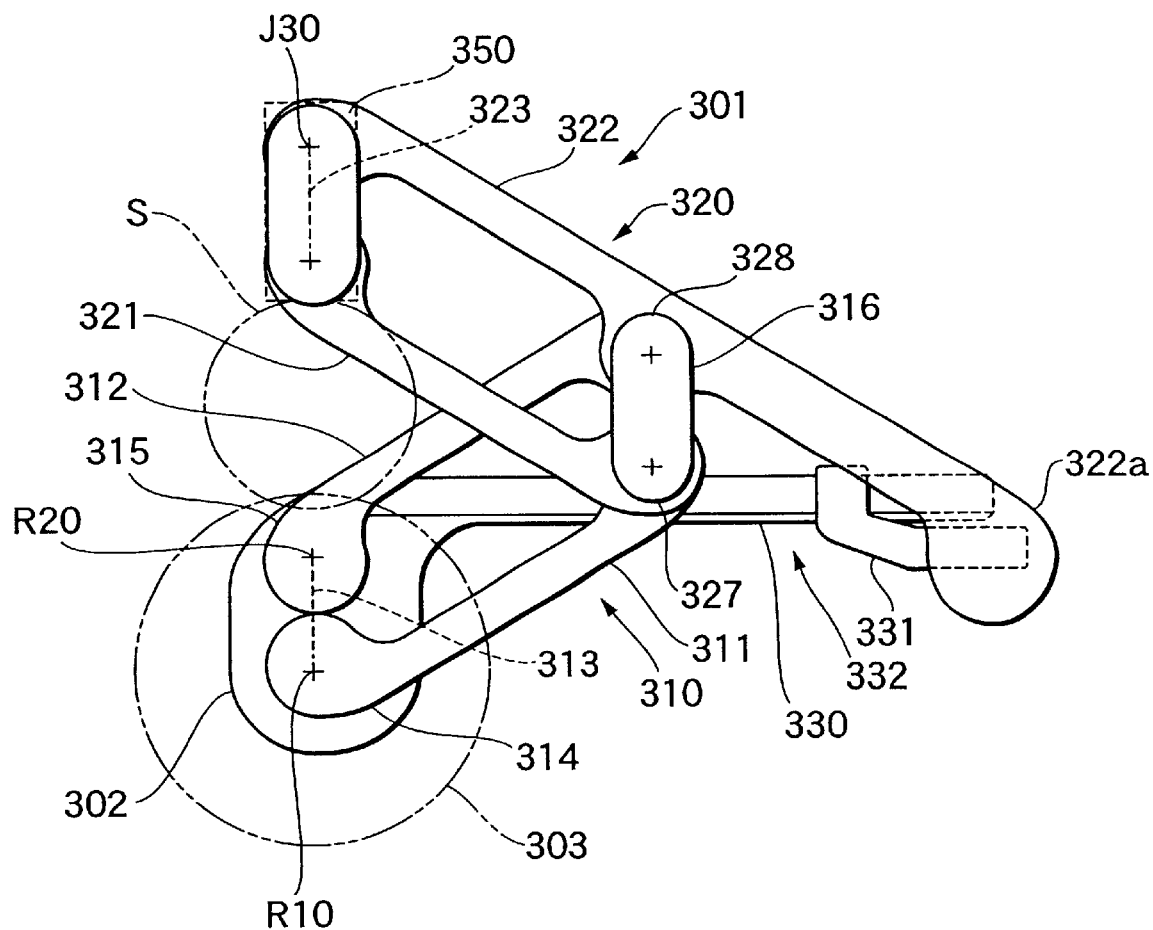
FIG. 10 is a plan view showing the structure of a transfer arm of a second embodiment according to the present invention.

Hereinafter, a second embodiment of the transfer arm of the present invention will be described with reference to the attached drawings. FIG. 10 is a plan view showing the entire of a transfer arm 301 supported by rotary shafts R10, R20 of a base plate 302 attached to a body 303 of a transfer apparatus such as a substrate transfer apparatus. The transfer arm 301 comprises two parallel links 310, 320 which are joined to each other by commonly using a short link element just like the known transfer arm using two parallel links.

That is, the transfer arm 301 comprises a first parallel link 310, a second parallel link 320, a linear guide 332, and a holding plate 350. The first parallel link 310 has two link elements 311, 312 arranged in parallel with each other, a base plate 302 supporting ends of the link elements 311, 312 together to compose a short link element 313, a drive shaft R10 as one arthrosis 314, a driven shaft R20 as the other arthrosis 315. By turning the drive shaft R10, the link elements 311, 312 are swung about the shafts R10, R20. The second parallel link 320 has a short link plate 316 also used as the other short link element as the opposite side of the short link element 313 of the first parallel link 310, and two link elements 321, 322 connected to arthroses 327, 328 and arranged in parallel with each other. The linear guide 332 has an extension of the link element 322 of the second parallel link 320, a slider 331 rotatably attached to the end of the extension, and a guide rail 330 linearly guiding the slider 331 in a direction perpendicular to the short link plate 316. The holding plate 350 is integrally attached to a short link plate 323 as the opposite side of the short link plate 316 of the second parallel link 320. A subject object (S) such as a substrate can be held on the end of the holding plate 350.

The arthroses 314, 315, 327, 328 include known ball bearings and can rotate about their respective axes indicated by "+" in FIG. 10 extending perpendicularly to the paper of the drawing accurately at a predetermined angle within movable ranges of the respective links. It should be noted that the axes of the arthroses may be marked by numeral "Ji" and the like in the following description. As shown in a side view of FIG. 11C, the interference between the first parallel link 310 and second parallel link 320 during rotation is prevented by adjusting the respective levels of the bearings. In addition, as shown in FIG. 10, since the link elements have eccentric axes, the parallelogram formed by the link elements is irregular so that the interference between the link elements can be prevented even when parallel opposite sides move to closest position. Then, the movement of the transfer arm shown in FIG. 10 will be described with reference to structural views: FIG. 11A, FIG. 11B, FIG. 11C, and FIG. 11D.

By turning the drive shaft R10 in a direction of arrow 6, the first parallel link 310 deforms, the short link plate moves while keeping the relation parallel to the substrate transferring direction C, and the slider 331 slides in a direction X. As a result, the second parallel link 320 deforms symmetrically as mirror images of the deformation of the first parallel link 310 and the holding plate (not shown) integrally attached to the short link plate 323 linearly moves in the substrate transferring direction C (perpendicular to the direction X of the linear guide). Assuming that areas at both sides of the linear guide installed position are defined as an area (m) and an area (n), respectively. By further turning the drive shaft R10 in the direction of arrow θ, the slider reaches the farthest point on the guide rail. After that, both the first parallel links 310 and the second parallel link 320 enter into the area (n) from the area (m) and the slider slides in a direction toward the body or returns. At the same time, the holding plate 350 moves in the direction C apart from the body (see FIG. 11B, FIG. 11C). Finally, the holding plate 350 can be linearly moved to a point (L) as the farthest point from the linear guide (see FIG. 11D). By turning the drive shaft R10 in the opposite direction, i.e. a direction of arrow −θ from this state, the holding plate 350 can be returned in the opposite direction (a direction toward the body) along the same tracing path as the approach route. FIG. 11C is a schematic side view showing an example of arrangement with regard to the levels of the link elements 311, 322 in the state shown in FIG. 11B. By adjusting the levels of the link elements 311, 322 as shown in FIG. 11C, the aforementioned parallel link movement can be achieved.

Figure 11D:
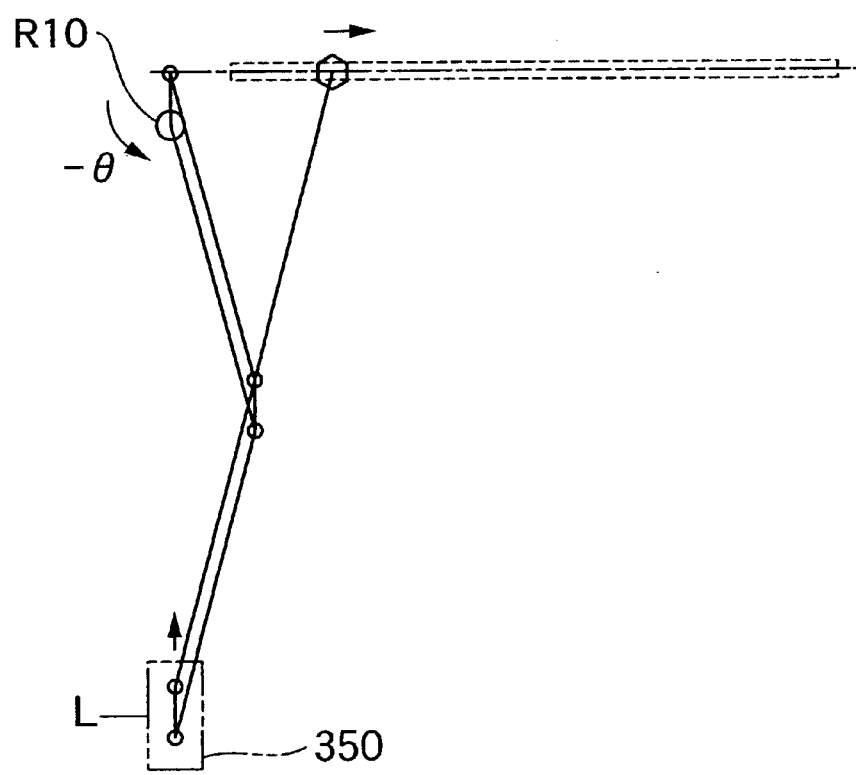
Figure 12:
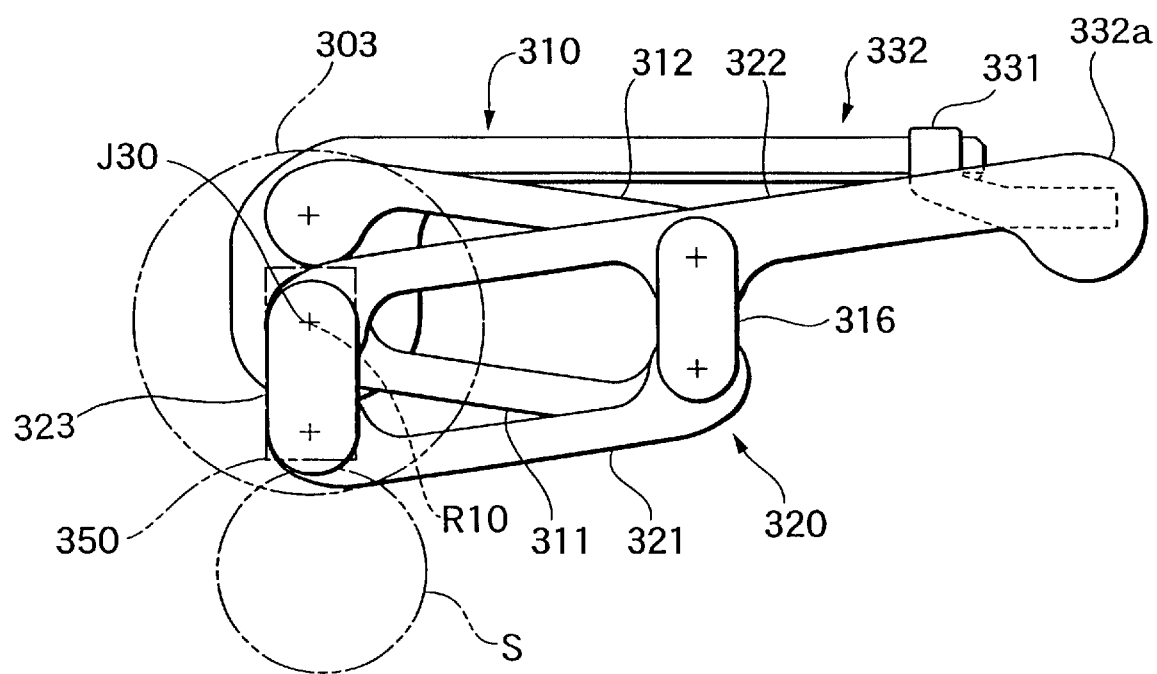
FIG. 12 is a plan view showing the operational state of the transfer arm shown in FIG. 10 (in the state where the arm is folded)
Figure 13:
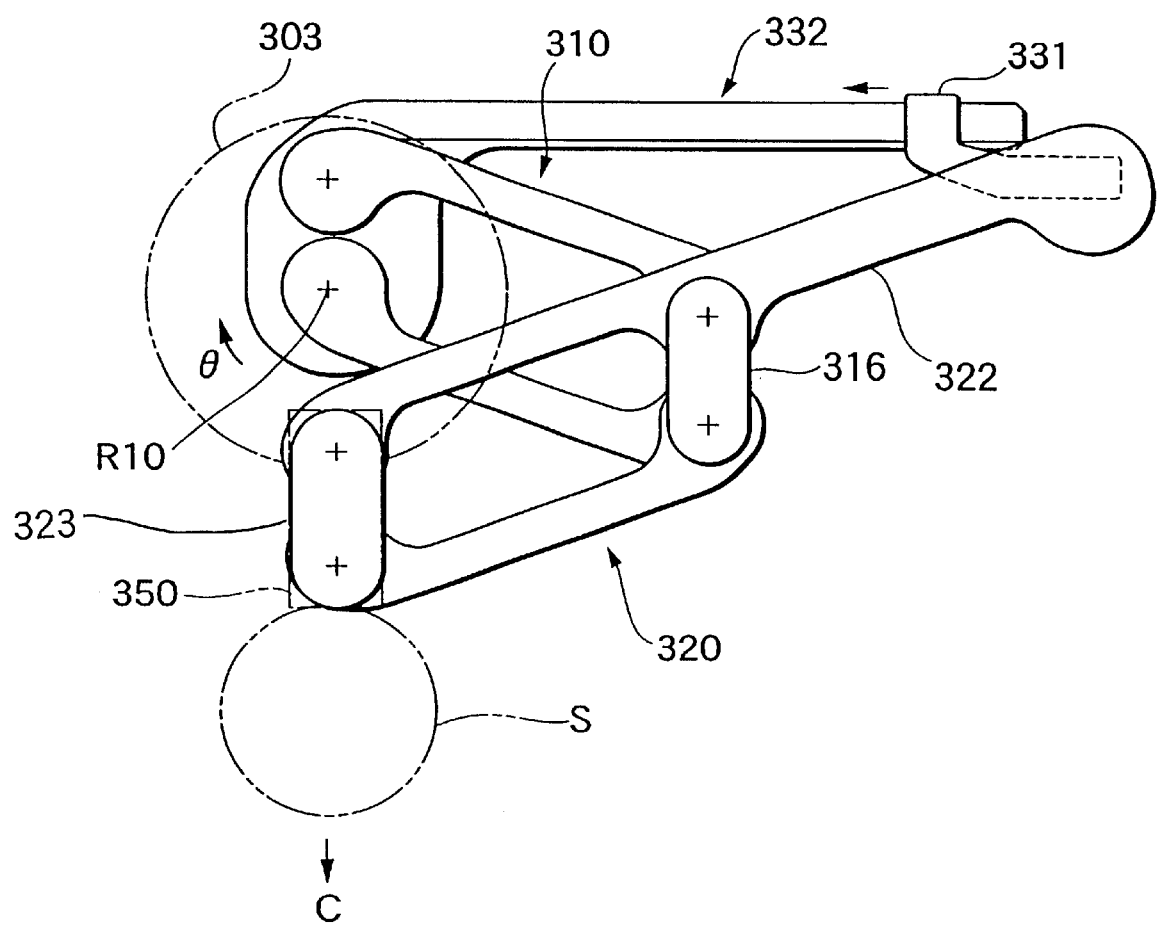
FIG. 13 is a plan view showing the operational state of the transfer arm shown in FIG. 10 (in the state where the arm starts to be stretched)
Figure 14:
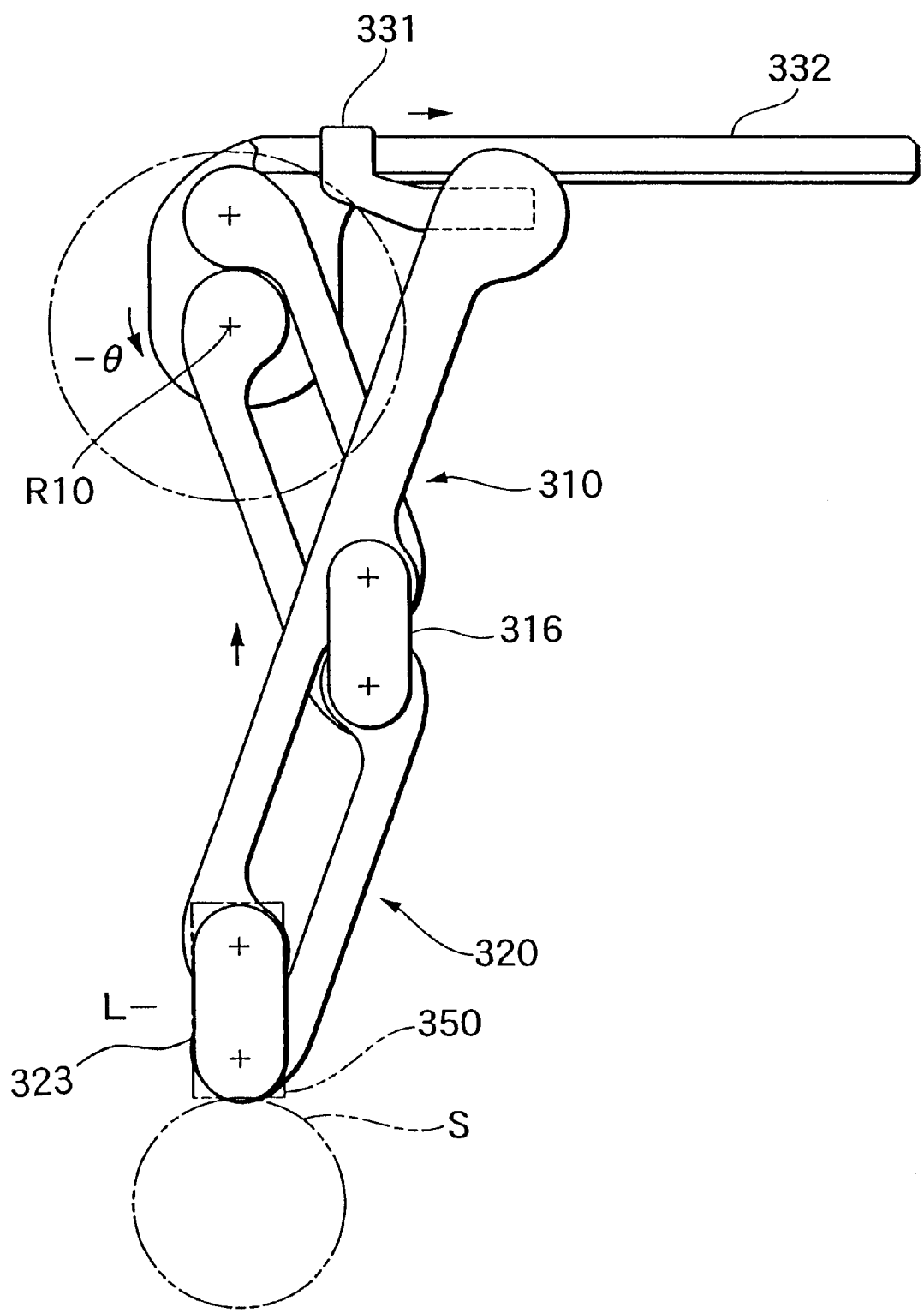
FIG. 14 is a plan view showing the operational state of the transfer arm shown in FIG. 10 (in the state where the arm is fully stretched)

FIG. 12 through FIG. 14 are views for explaining the states of movements of the transfer arm shown in FIG. 10 within the area (n) while the holding plate 350 is brought from the body to the farthest point(L: see FIG. 11D) according to the rotation of the drive shaft R10.

FIG. 12 shows a state where the articular axis J30 of the short link plate 323 coincides with the drive shaft R10. At this point, the slider 331 attached to the end 322a of the second parallel link 320 is positioned at a point on the linear guide 332 farthest from the body 303. From the state shown in FIG. 12, by turning the drive shaft R10 in the direction of arrow θ, the slider 331 slides to return toward the body and, during this, the holding plate 350 moves in the direction C apart from the body. FIG. 13 shows a state where the components are in positions substantially corresponding to the structural view of FIG. 11B. By further turning the drive shaft R10, the transfer arm is finally deformed as shown in FIG. 14 so as to move the holding plate 350 to the position L. When the holding plate is moved to the position L, the transfer arm is in the eccentric state just before the link elements 311, 312, 321, 322 of the parallel links are interfered.

Figure 15A:
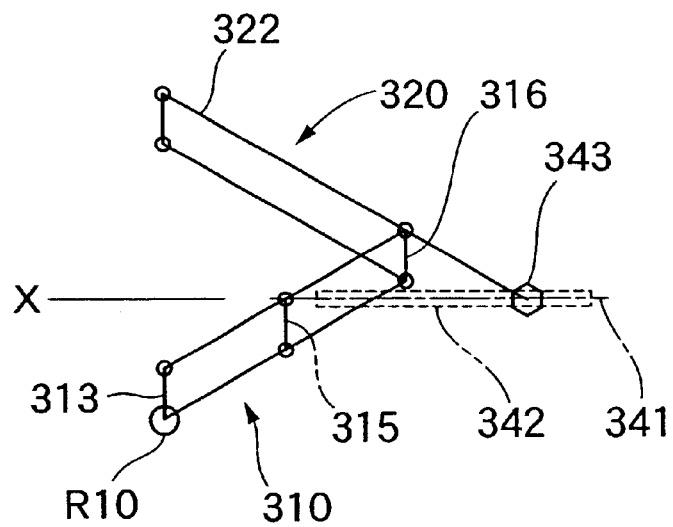
FIG. 15A, FIG. 15B, FIG. 15C, and FIG. 15D are views for explaining the structure of a linkage of a variation of the second embodiment and the respective operational states of the transfer arm.
Figure 15B:
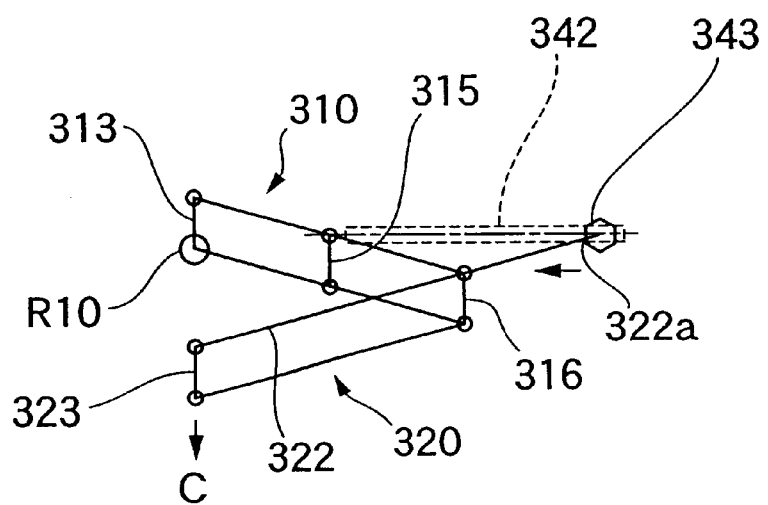
Figure 15C:
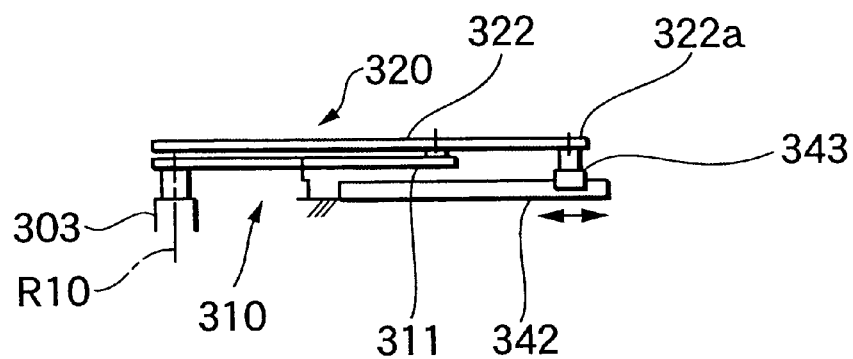
Figure 15D:
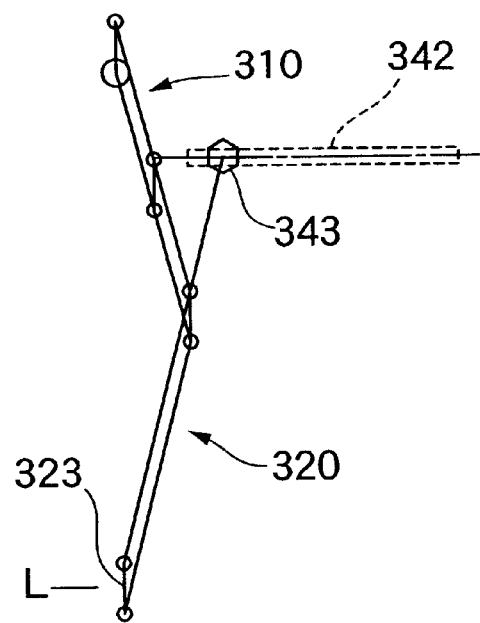

FIG. 15A, FIG. 15B, FIG. 15C, FIG. 15D are views showing the structure of a linkage of a variation of the second embodiment and the respective operational states of the transfer arm. In this transfer arm, an intermediate plate 315 is arranged in the first parallel link 310 wherein the intermediate plate 315 is parallel to the short link element 316 as the opposite side of the short link element 313 of the first parallel link 310. A linear guide 342 is fixed to the intermediate plate 315 to extend in a direction (direction X) perpendicular to the longitudinal direction of the intermediate plate 315 (see FIG. 15A). The linear guide 342 has the same structure as the linear guide 332 attached to the transfer arm 301 shown in FIG. 10 so that a slider 343 can slide along the guide rail 341. The slider 343 is rotatably attached to the end 322a of the extension of the link element 322 of the second parallel link 320 so that the slider 343 slides along a guide rail 341 of the linear guide 342 to restrict the movement of the end 322a of the extension extended from the two parallel links (the first parallel link 310, the second parallel link 320) which are deformed according to the rotation of the drive shaft R10 (see FIG. 15B, FIG. 15C). Accordingly, the holding plate (not shown) disposed on the short link element of the second parallel link 320 is linearly moved to the position L along the transferring direction in the same manner as the case shown in FIGS. 11A through 11D (see FIG. 15D). In this embodiment, as shown in FIG. 15C, since the linear guide 342 is fixed to the intermediate position of the first parallel link 310, the linear guide 342 of which stroke is shorter than that of the linear guide shown in FIGS. 11A through 11D can be employed. When the transfer arm 301 is mounted on a substrate transfer apparatus, a housing chamber having reduced volume can be employed.

Figure 16:
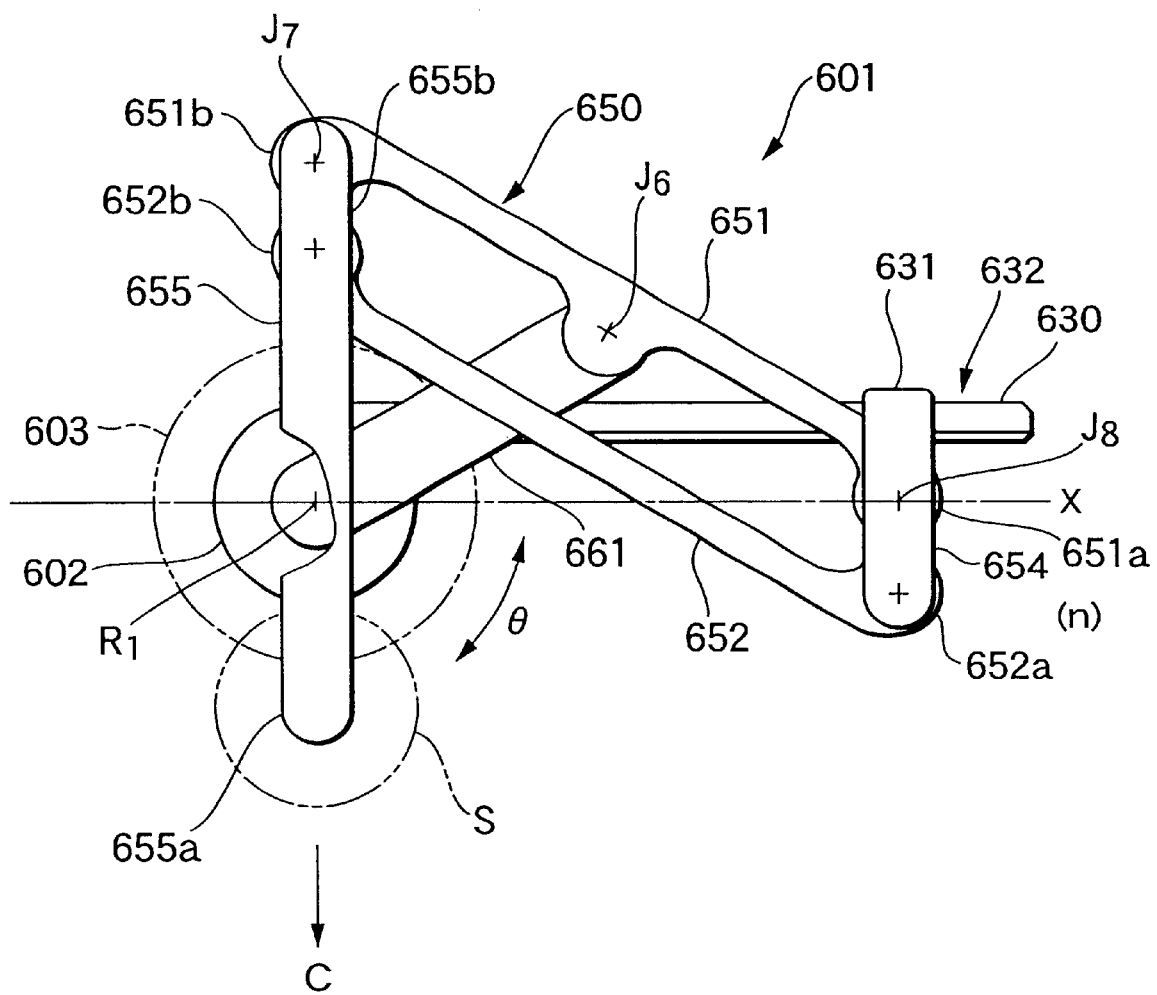
FIG. 16 is a plan view showing the structure of a transfer arm of a third embodiment according to the present invention (in the state where the arm is folded)

Hereinafter, a third embodiment of the transfer arm will be described with reference to the attached drawings. FIG. 16 is a plan view showing the entire of a transfer arm 601 supported by a rotary shaft R1 of a base plate 602 attached to a body 603 of a transfer apparatus such as a substrate transfer apparatus. The transfer arm 601 comprises a lever 661 fixed to the rotary shaft R1 to allow the swing motion of the lever 661, and a parallel link 650 having a link element 651 of which a middle point is joined to the other end of the lever 661 by a pin joint. An arthrosis J8 of the link element 651 of the parallel link is connected to a slider 631 by a pin. The slider 631 is slidably supported to a linear guide 632 having a guide rail 630 extending in a direction (X) perpendicular to a transferring direction C (substrate transferring direction) of a subject object (S) such as a substrate. The slider 631 is integrally formed with a plate 654 extending in a direction perpendicular to the linear guide 632 (in a direction parallel to the transferring direction C). An end 651a of the link element 651 and an end of the link element 652 as another component of the parallel link 650 are connected to the plate 654 by pins, so that the plate 654 composes a short link element of the parallel link 650. The other ends 651b, 652b of the two parallel link elements 651, 652 are connected to a substrate holding rod 655 by pins. Therefore, a portion 655b, at an end, of the substrate holding rod 655 is supported by the ends 651b, 652b of the link elements 651, 652 and thus functions as a short link element of the parallel link 650. The subject object (S) such as a substrate is mounted on the other end 655a of the substrate holding rod 655. It should be noted that, in FIG. 16, the substrate holding rod 655 is partially broken away to illustrate the rotary shaft R1. In this embodiment, the relation among the length from the rotary shaft R1 to an arthrosis J6 of a lever 661 (R1J6), the length from the arthrosis J6 to J7 (J6J7), and the length from the arthrosis J6 to J8 (J6J8) is set to be:

(R1J6)=(J6J8)=(J6J7).

The lever 661 is swung in a direction θ about the rotary shaft R1. According to this swing motion of the lever 661, the slider 631 moves along the guide rail 630 in the direction X and the arthrosis J7 i.e. the substrate holding rod 655 is securely moved linearly in the transferring direction C. In this manner, the subject object S such as a substrate can be transferred to a destination with high accuracy. If required accuracy is in a degree as to achieve the nearly linear movement, the relation mentioned above may be set to:

(R1J6):(J6J8)=(J6J8):(J6J7).

Figure 17:
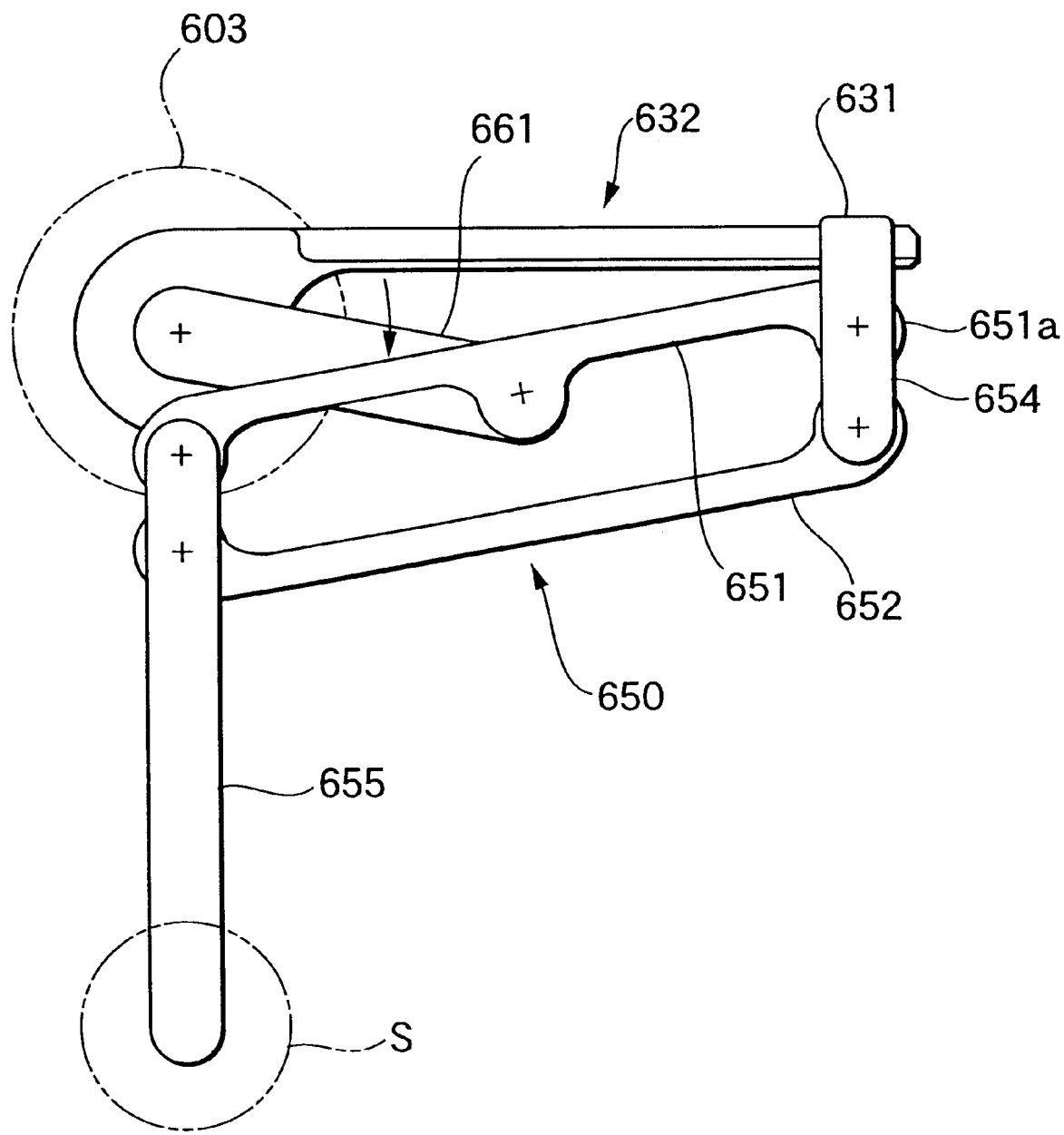
FIG. 17 is a plan view showing the operational state of the transfer arm shown in FIG. 16 (in the state where the arm starts to be stretched)
Figure 18:
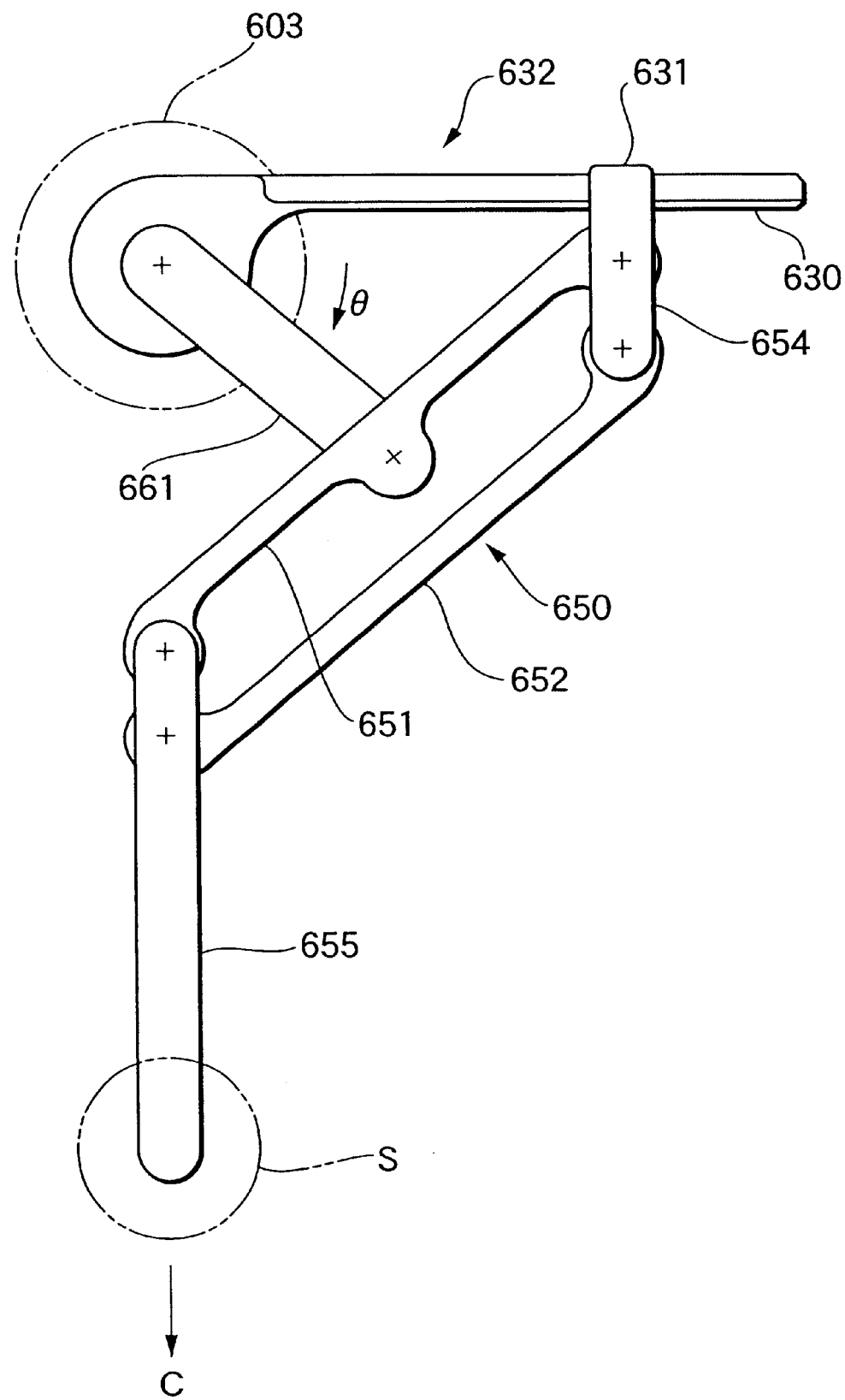
FIG. 18 is a plan view showing the operational state of the transfer arm shown in FIG. 16 (in a state during the stretching operation of the arm)
Figure 19:
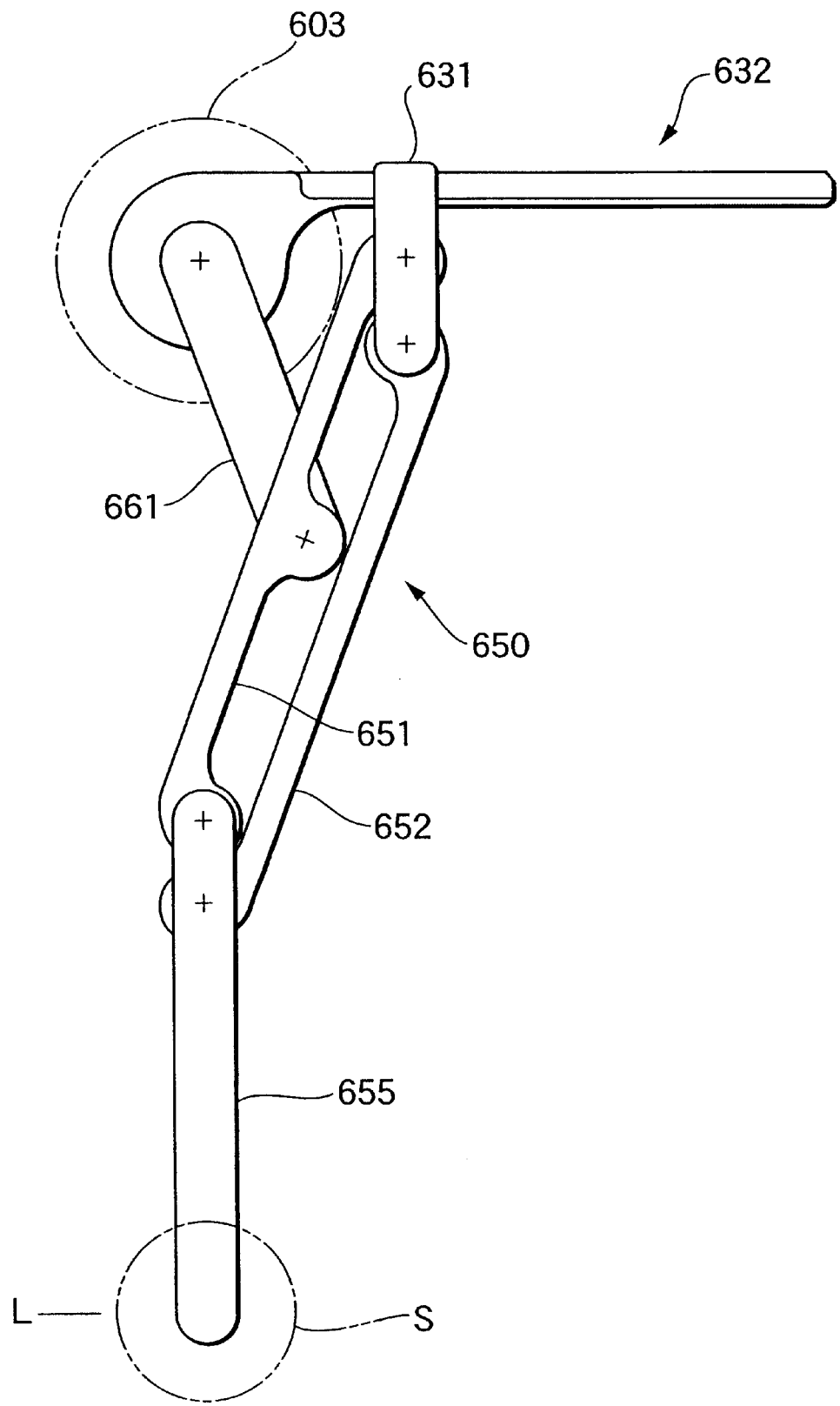
FIG. 19 is a plan view showing the operational state of the transfer arm shown in FIG. 16 (in the state where the arm is fully stretched)

FIGS. 17–19 are explanatory views showing the states while the transfer arm shown in FIG. 16 transfers the subject object (S) from the body 603 to the farthest point (L: see FIG. 19) according to the rotation of the drive shaft R1 within an area (n).

FIG. 17 shows the state where the lever 661 is swung in the direction of arrow from the initial position to a position just after the position where the lever 661 is parallel to the linear guide 632. At this point, the slider 631 attached to the end 651*a* of the parallel link 650 is in a position slightly shifted toward the drive shaft R1 side from the farthest point. From the state shown in FIG. 17, the slider 631 moves along the guide rail 630 on the linear guide 632 in such a direction as to return toward the body 603 by turning the drive shaft R1 for θ in the direction of arrow as shown in FIG. 18. At the same time, the substrate holding rod 655 moves in a direction C apart from the body. By further turning the drive shaft R1, the parallel link 650 finally transforms in the eccentric state to a position shown FIG. 19 just before the link elements 651, 652 are interfered. Therefore, the substrate holding rod 655 can be moved to the farthest point ("L" in FIG. 19) from the body 603 along the transferring direction C. At this point, the slider 631 is at the nearest point on the linear guide 632 to the body 603.

FIG. 20 through FIG. 24 are views for explaining the structure of a transfer arm according to a forth embodiment the respective operational states of parallel links and a slider.

Figure 20:
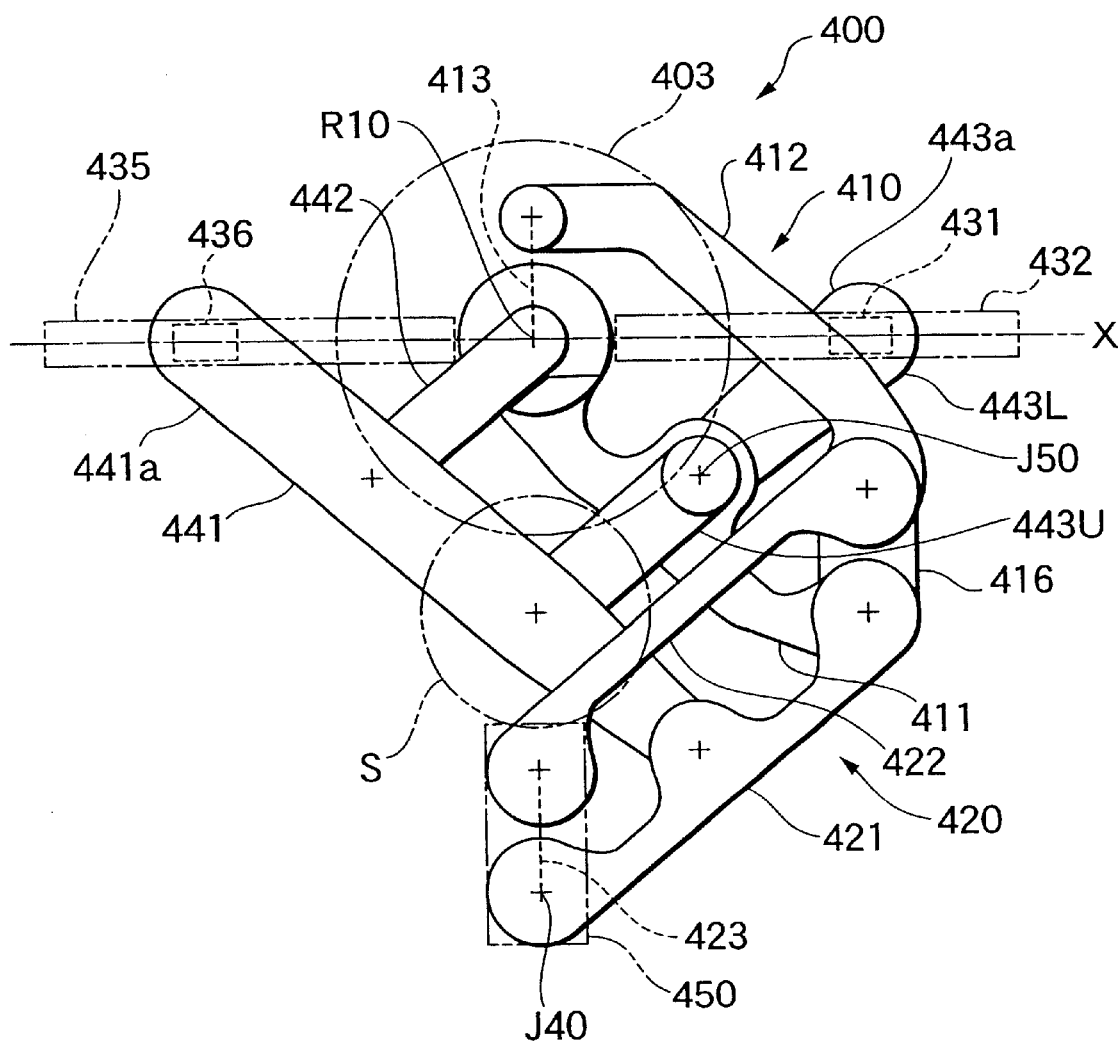
FIG. 20 is a plan view showing the structure of a transfer arm of a third embodiment according to the present invention.
Figure 21A:
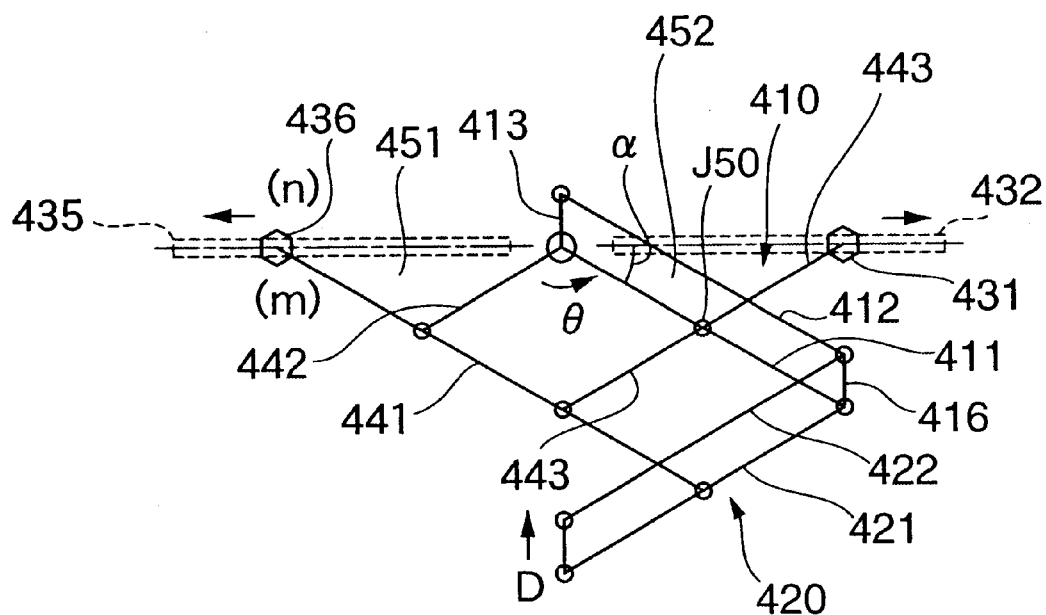
FIG. 21A, FIG. 21B, FIG. 21C, and FIG. 21D are views showing the structure of a linkage of and the respective operational states of the transfer arm shown in FIG. 16.

A transfer arm 400 is similar to the transfer arm 301 of the second embodiment as shown in the structural view of FIG. 20 and the view of FIG. 21A. That is, the transfer arm 400 has a drive shaft R10 which is disposed at an end of a link element 411 of a first parallel link 410, and comprises two parallel links (the first parallel link 410, a second parallel link 420) as the main components which are deformable according to the rotation of the drive shaft R10, and two linear guides 432, 435 for guiding the motion of the linkage, wherein the linear guide 432 has a slider 436 to which a guide rod 441 parallel to link elements 411, 412 of the first parallel link 410 is connected. As shown in FIG. 20, FIG. 21A, the guide rod 441 forms a parallel link together with the link element 411 of the first parallel link 410 to which rotation is directly applied by the drive shaft R10, and rods 442 and 443U parallel to the second parallel link 420. The rod 441 has an extension 441*a* which is connected at its end to the slider 436 which linearly moves on the first linear guide 435. A link element 443 is cranked at the arthrosis J50 to be formed in a Z shaped in its side view and is composed of rods 443U, 443L. An end 443*a* of the rod 443L is connected to a slider 431 which linearly moves on the second linear guide 432. As shown in FIG. 20, FIGS. 21A–21D, the two linear guides (the first linear guide 435 and the second linear guide 432) are aligned in a line X extending through the drive shaft R10. The ends of the linear guides 435, 432 are fixed to portions of the body 403. That is, the transfer arm is composed of mirror-like symmetrical isosceles-triangular links 451, 452 of which base sides are the first linear guide 435 and the second linear guide 432, respectively and summits are composed of a common point at the drive shaft R10. The isosceles-triangular links 451, 452 are deformed while keeping congruent shapes together with movements of the parallel links 410, 420.

Figure 11A:
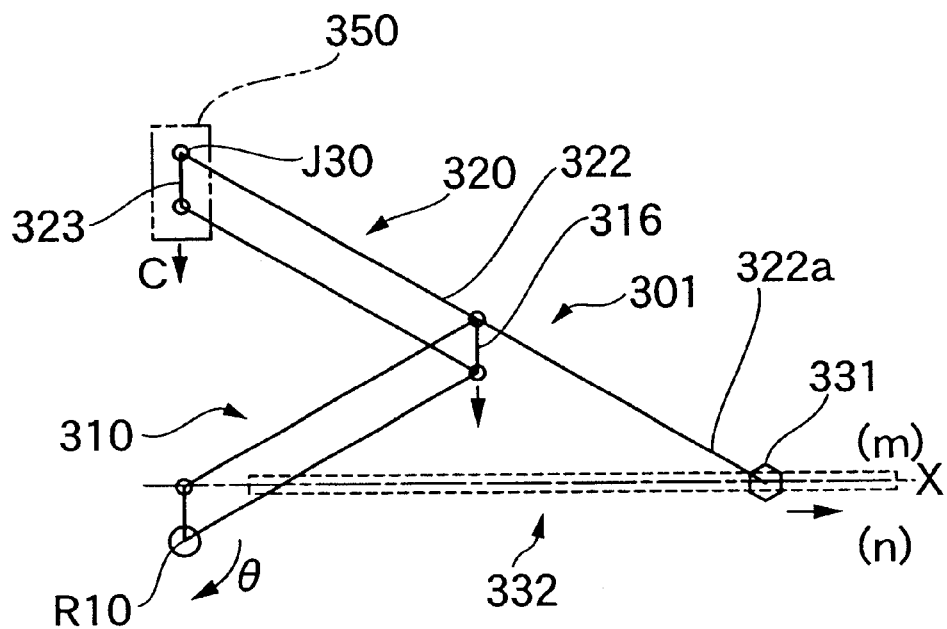
FIG. 11A, FIG. 11B, FIG. 11C, and FIG. 11D are views showing the structure of a linkage of and the respective operational states of the transfer arm shown in FIG. 10.
Figure 11B:
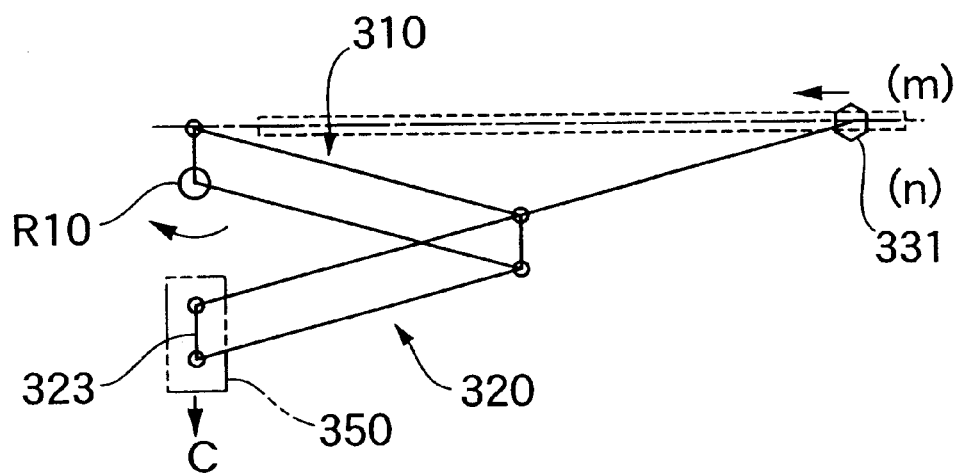
Figure 11C:
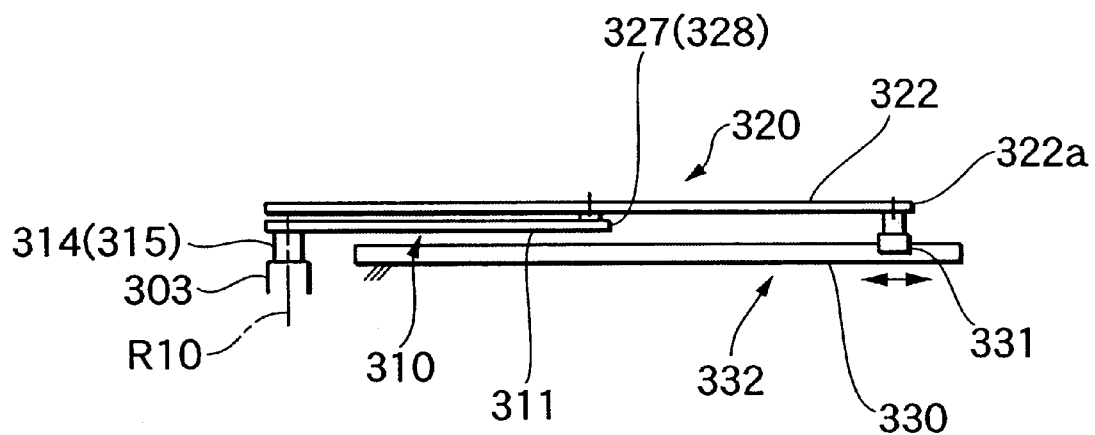
Figure 21B:
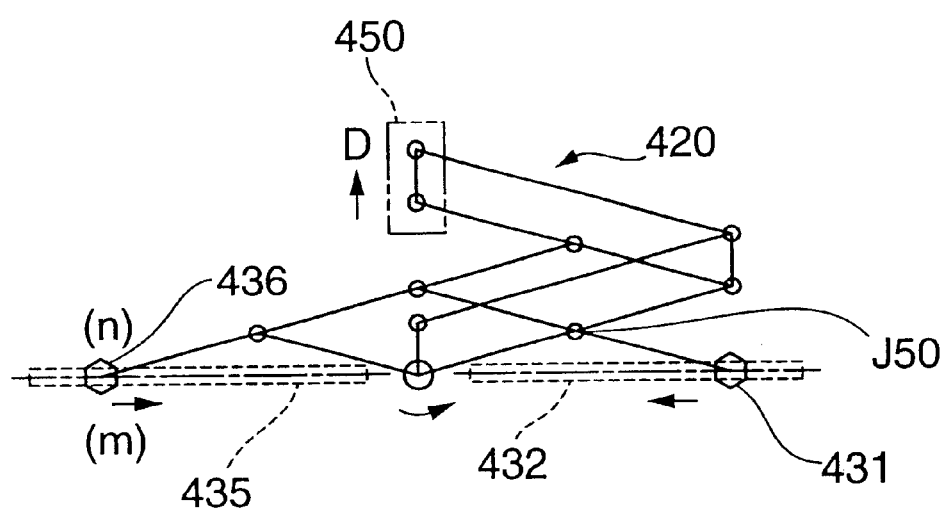
Figure 21C:
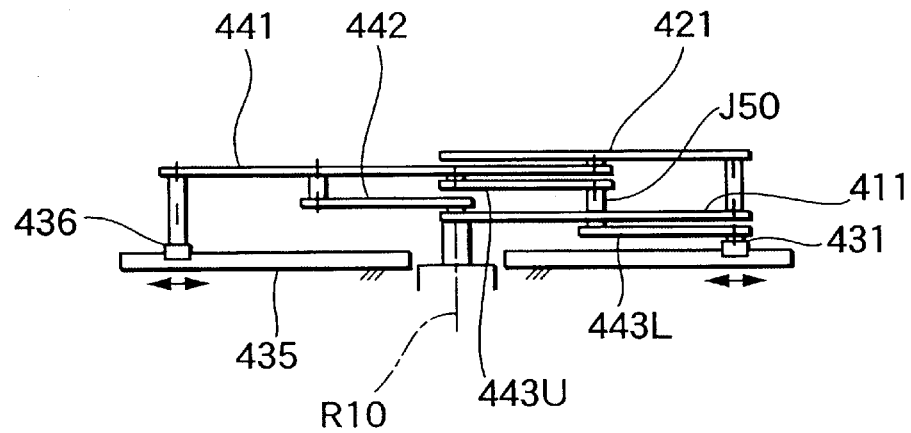
Figure 21D:
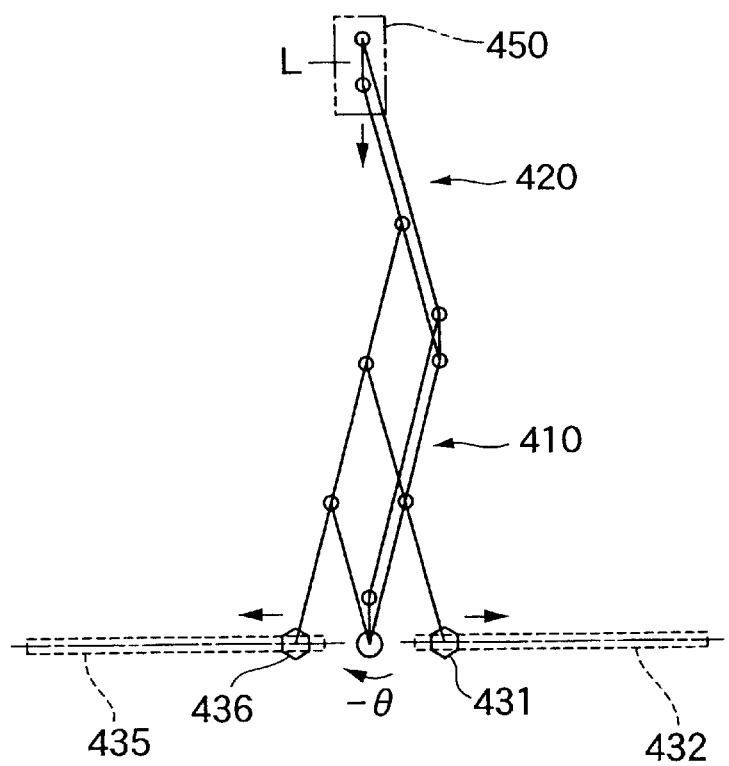

FIG. 21B and FIG. 21D are views showing the similar operational states as shown in FIG. 11B and FIG. 11D, in which the end of the transfer arm moves within an area (m) and reaches to the farthest point L from the body. FIG. 21D shows a state in which a holding plate 450 starts to be returned in the opposite direction (direction toward the body) along the same tracing path as the approach route. FIG. 21C is a schematic side view showing an example of arrangement with regard to the levels of the link elements and rods 411, 421, 441, 442, and 443. By adjusting the levels of the link elements and rods, the aforementioned parallel link movement can be achieved.

Figure 22:
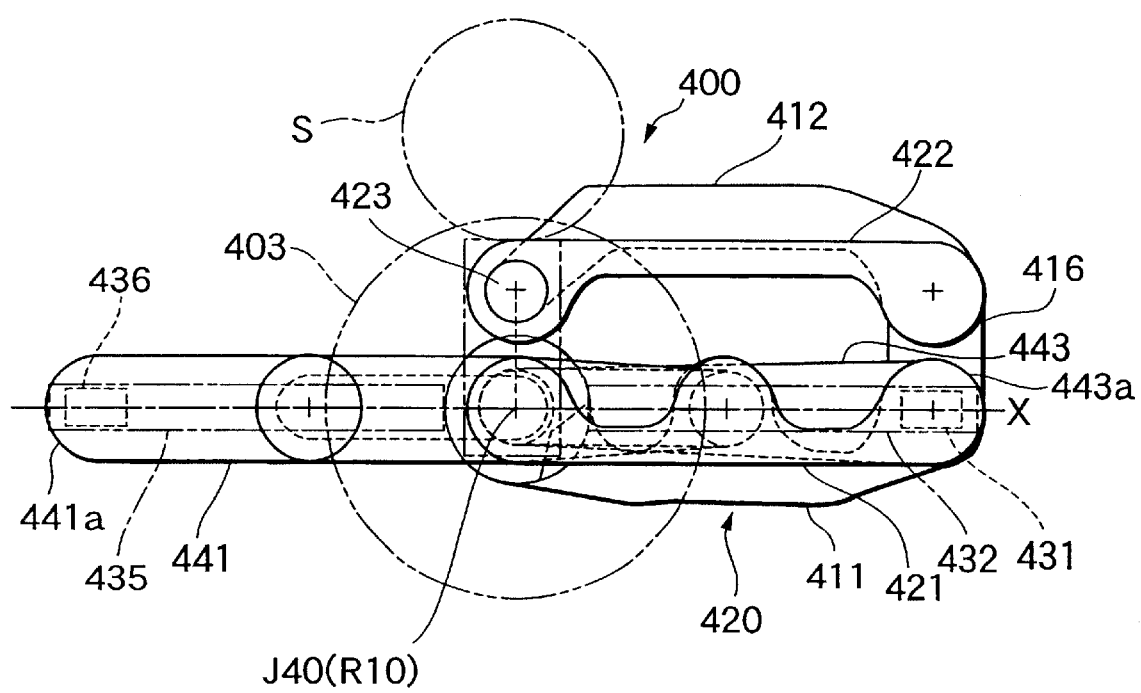
FIG. 22 is a plan view showing the operational state of the transfer arm shown in FIG. 16 (in the state where the arm is folded)
Figure 23:
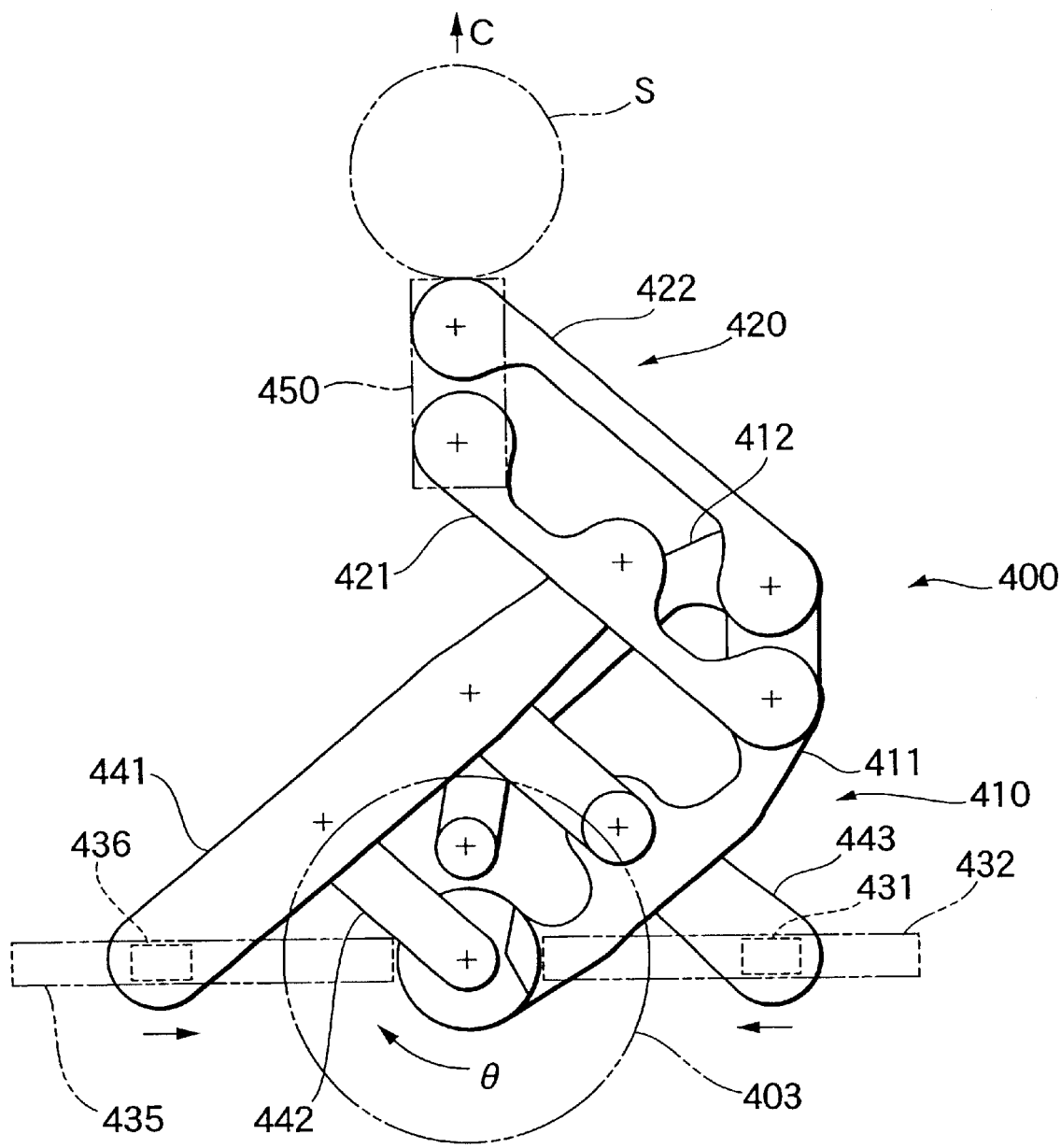
FIG. 23 is a plan view showing the operational state of the transfer arm shown in FIG. 20 (in a state during the stretching operation of the arm)
Figure 24:
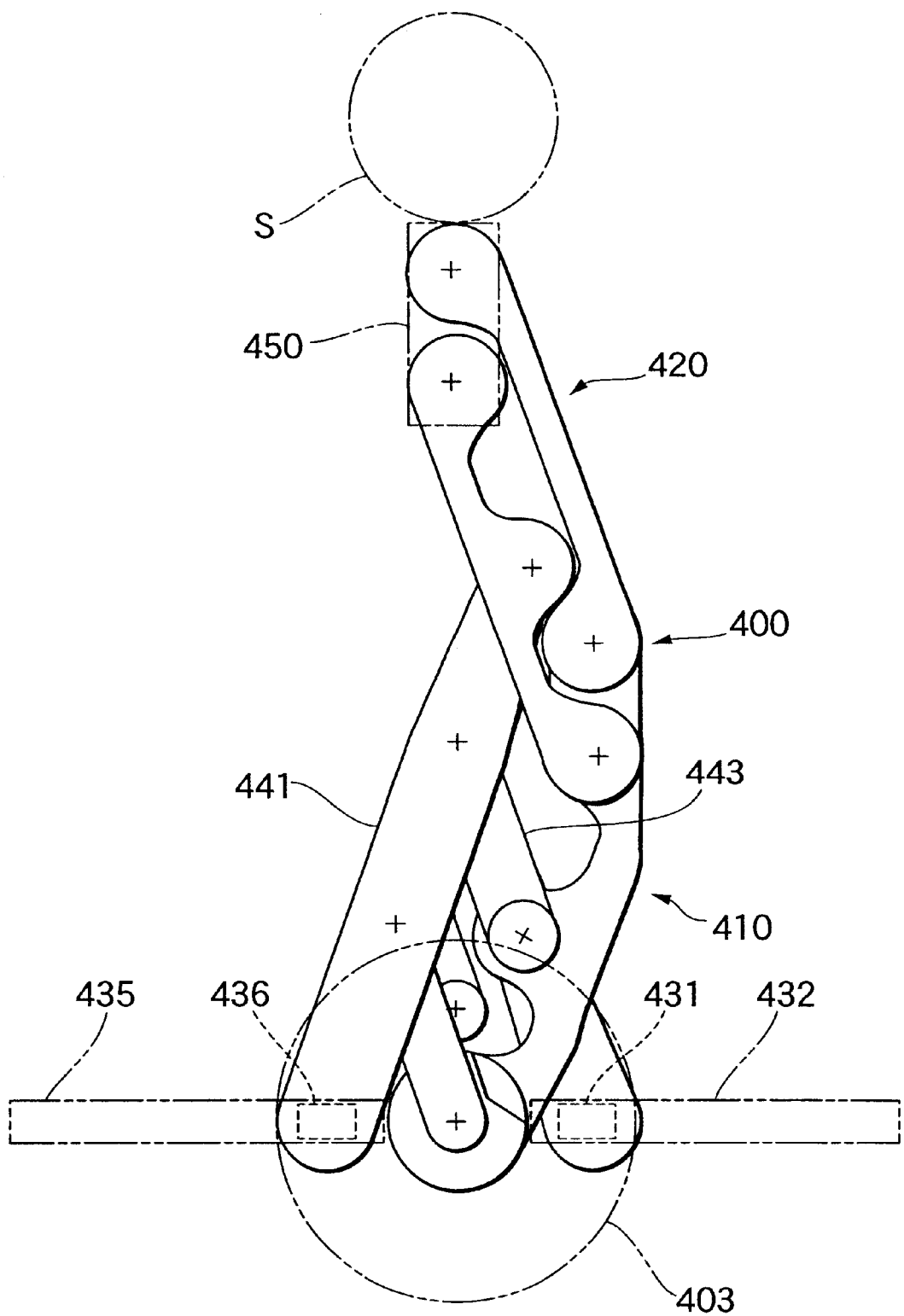
FIG. 24 is a plan view showing the operational state of the transfer arm shown in FIG. 20 (in the state where the arm is fully stretched)

FIG. 22 through FIG. 24 are views for explaining the states of movements of the transfer arm shown in FIG. 20 within the area (n) while the holding plate 450 is brought from the body to the farthest point(L: see FIG. 21D) according to the rotation of the drive shaft R10. FIG. 22 shows a state where an articular axis J40 of a short link plate 423 coincides with the drive shaft R10. At this point, the axis of the guide rod 441 connected to the second parallel link 420 is positioned on the same line of the axis of the linear guides. In this state, the sliders 436, 431 connected to the ends of the extensions 441*a*, 443*a* are in the farthest point from the body. The axes of the link elements and the rods are aligned on the same line at different levels. For understanding the aforementioned state, some arms are shown by broken lines.

From the state shown in FIG. 22, by turning the drive shaft R10 in the direction of arrow θ, the sliders 431, 436 of the linear guides 432, 435 slide to return toward the body 403 and, during this, the holding plate 450 moves in the direction C apart from the body 403 as shown in FIG. 23. FIG. 23 shows a state where the components are in positions substantially corresponding to the structural view of FIG. 21B. By further turning the drive shaft R10, the transfer arm is finally fully extended to the position as shown in FIG. 24 into a flat shape just before the link elements and rods 411, 412, 421, 422 of the parallel links 410, 420 are interfered each other. In this state, the sliders 431, 436 of the two linear guides 432, 455 are positioned closest to each other.

FIG. 25A, FIG. 25B, FIG. 25C, FIG. 25D, and FIG. 26A, FIG. 26B, FIG. 26C, FIG. 26D are views showing the structure of a linkage of a variation of the forth embodiment. In the transfer arm of this variation, instead of the two isosceles-triangular links of which base sides are the linear guides, one rhombic link of which a symmetry axis is one linear guide, is required. In this transfer arm, a rhombic link of which opposite summits are a drive shaft R10 and a slider is formed by disposing a guide rod and an assisted rod in parallel with link elements of two parallel links to move in parallel with the corresponding link elements of the parallel links, and connecting the guide rod and the assisted rod to the slider of one linear guide extending in a direction of passing through the drive shaft R10. A holding plate (not shown) can be moved because of the deformation of the rhombic link.

Figure 25A:
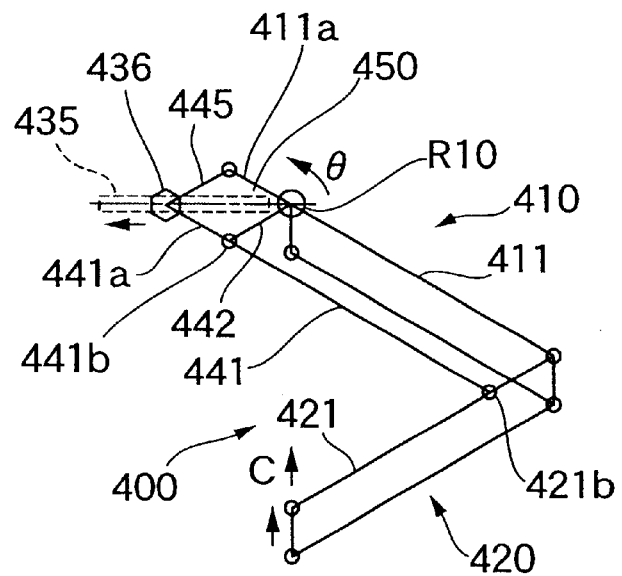
FIG. 25A, FIG. 25B, FIG. 25C, and FIG. 25D are views for explaining the structure of a linkage of a variation of the third embodiment and the respective operational states of the transfer arm.
Figure 25B:
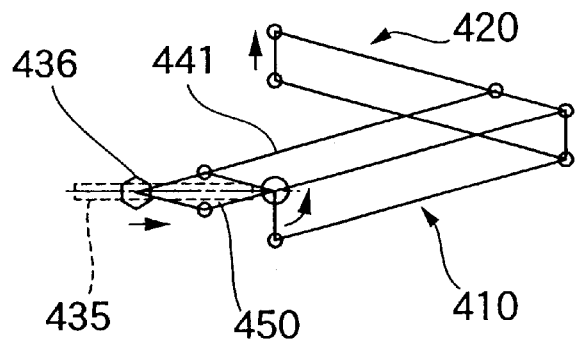
Figure 25C:
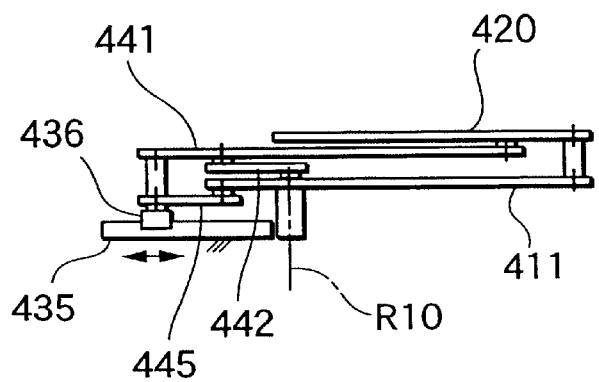
Figure 25D:
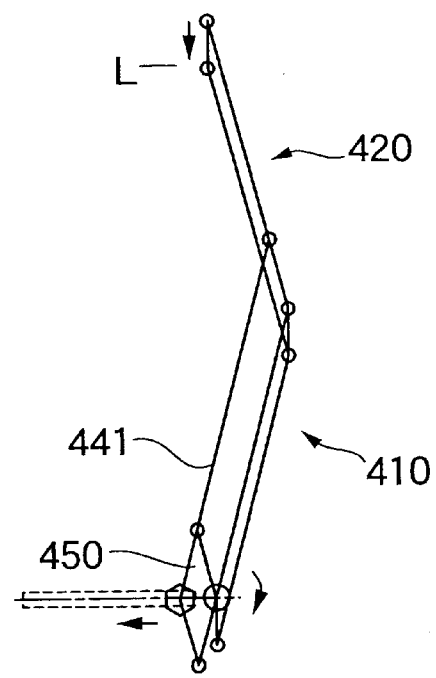

In the transfer arm 400 shown in FIG. 25A, the guide rod 441 is disposed in parallel with the link element 411 of the first parallel link 410 to connect an intermediate position 421*b* of the link element 421 of the second parallel link 420 to the slider 436. To restrict the movement of the guide rod 441, an intermediate rod 442 parallel to the link element 421 is disposed between the drive shaft R10 and a middle position 441*b*. Accordingly, the intermediate rod 442, the extension 441*a* of the guide rod 441, the extension 411*a* of the link element of the second parallel link 410, and a link element 445 form together a rhombic link 450 of which opposite summits are the drive shaft R10 and the slider 436 on the linear guide 435. According to this structure, the integral movement of the parallel links 410, 420 can be restricted by using one linear guide 435 of which stroke is short as shown in FIG. 25A through FIG. 25D, achieving the reduction in size of the transfer arm 400.

Figure 26A:
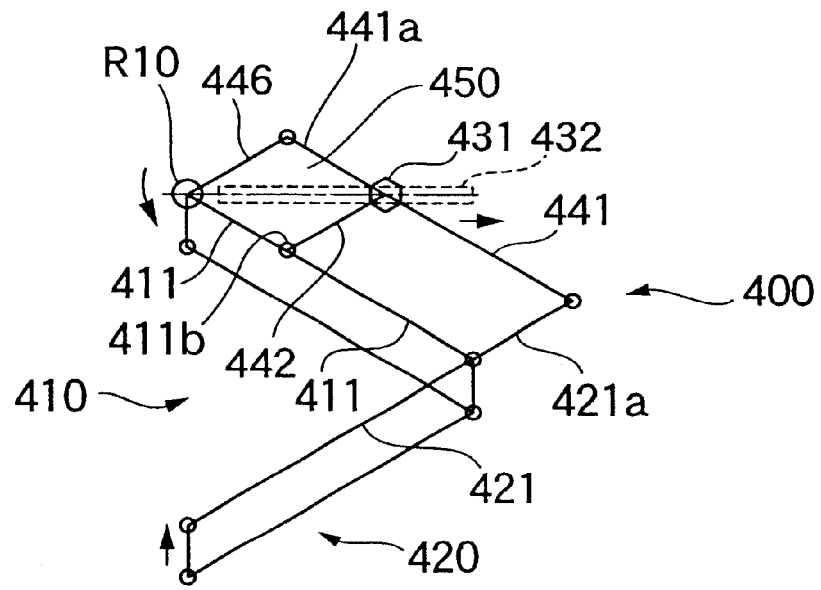
FIG. 26A, FIG. 26B, FIG. 26C, and FIG. 26D are views showing the structure of a linkage of another variation of the third embodiment and the respective operational states of the transfer arm.
Figure 26B:
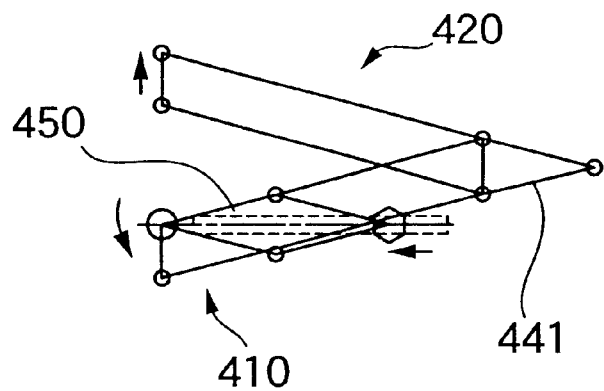
Figure 26C:
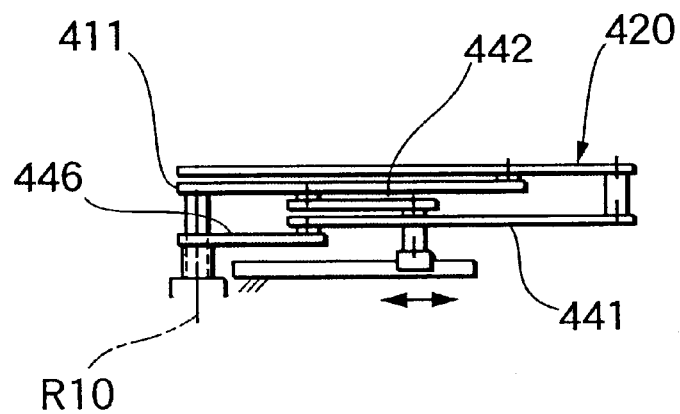
Figure 26D:
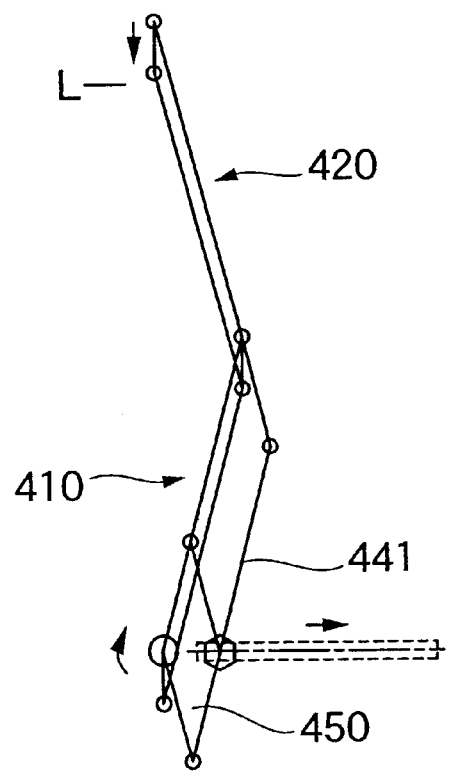
Figure 27:
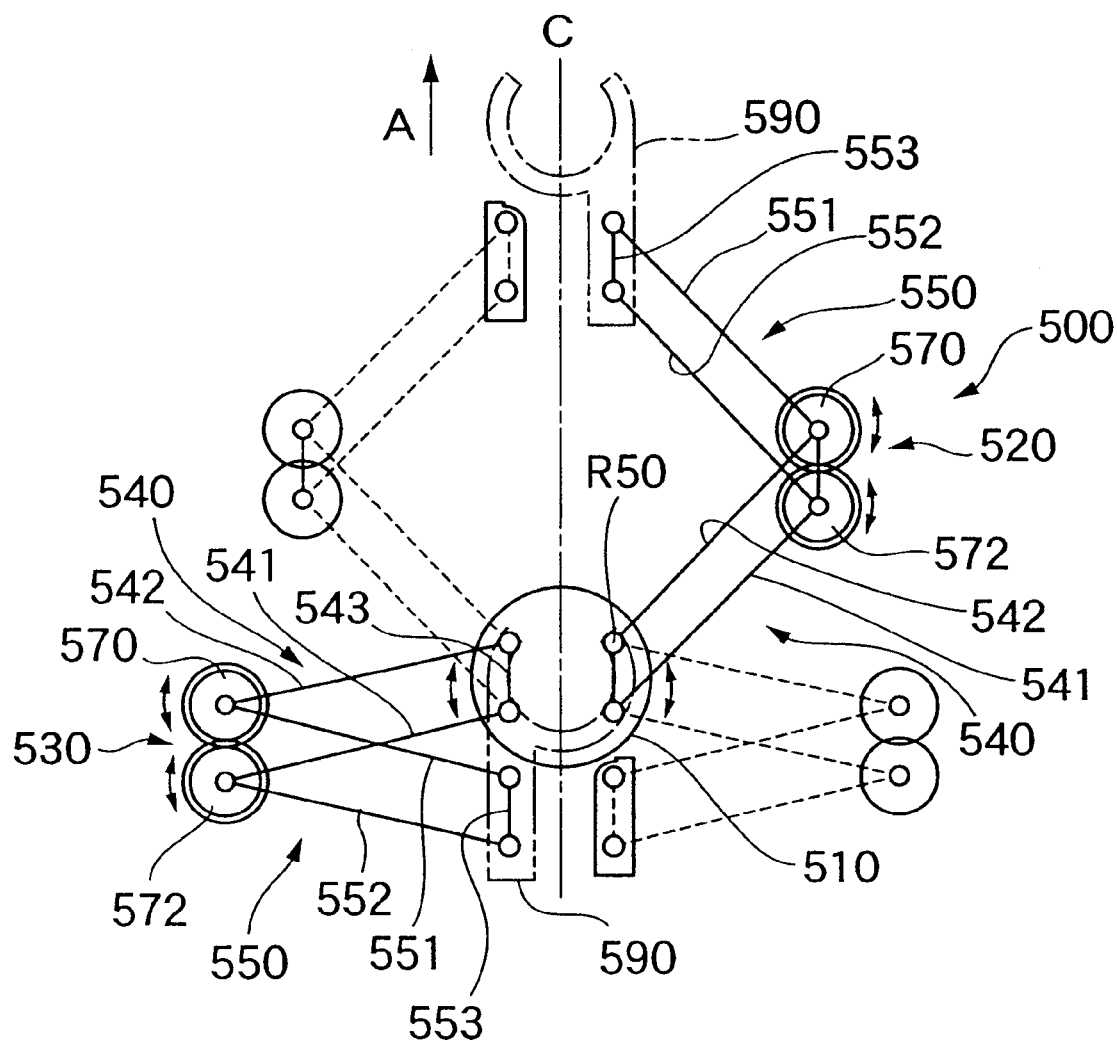
FIG. 27 is a schematic plan view showing one example of conventional transfer arms.

In the transfer arm 400 shown in FIG. 26A, the guide rod 441 is disposed in parallel with the link element 411 of the first parallel link 410 to connect the end of an extension 421a of the link element 421 of the second parallel link 420 to a slider 431. To restrict the movement of the guide rod 441, an intermediate rod 442 parallel to the link element 421 is disposed between the slider 431 and a middle position 441b of the link element 441. Accordingly, the intermediate rod 442, the extension 441a of the guide rod 441, a portion of the first parallel link 410, and a link element 446 form together a rhombic link 450 of which opposite summits are the drive shaft R10 and the slider 431 on the linear guide 432. According to this structure, one linear guide 432 of which stroke is short is disposed at the same side of the parallel links 410, 420 to achieve parallel link movement, thereby achieving the reduction in size of the transfer arm 400.

Though the description was made as regard to the parallel link movement of the transfer device having only one transfer arm, a double-arm transfer mechanism can be achieved by arranging two transfer arms on two linear guides closely arranged in parallel.

Among the components mentioned above, the linear guides 332, 432, 435 may be of any structural type known in the art according to the demanded precision. Though the ball bearings are employed for allowing the rotation of the respective arthroses in the above embodiments, radial bearings of any structural type may be employed. Since all of components can be heat resisting members, the transfer arm of this invention can exhibit effect when used under high temperature condition. Further, since bearings with solid lubricant are used for the respective arthroses, the transfer arm can be used under ultra-high vacuum condition.

What is claimed is:

1. A transfer arm comprising, a first short link, a first parallel link having a first link element pivotally connected to the first short link at one end thereof, and a second link element pivotally connected to the first short link at one end thereof, a drive shaft connected to the one end of the second link element to rotate the same, a second short link pivotally connected to the other ends of the first and second link elements, a second parallel link having a third link element and a fourth link element shorter than the third link element, a middle portion of the third link element and one end of the fourth link element being pivotally connected to the second short link, a third short link pivotally connected to one end of the third link element and the other end of the fourth link element, a holding plate connected to the third short link to be moved linearly according to a rotation of the drive shaft while deforming parallelograms formed by the first to fourth link elements, and a linear guide integrally formed with the first short link and extending from a side close to the first link element in a direction perpendicular to the first short link, the other end of the third link element being linearly slidably attached to the linear guide so that the holding plate can be moved linearly over two sides divided by the linear guide.

2. A transfer arm according to claim 1, wherein said first short link forms a base plate for the transfer arm and adapted to be attached to a transfer apparatus.

3. A transfer arm according to claim 2, wherein said first to fourth link elements have connecting portions connecting with the first to third short links, said connecting portions projecting laterally sidewardly from respective sides of the link elements and being arranged so that the connecting portions of the first parallel link face each other and the connecting portions of the second parallel link face each other.

4. A transfer arm according to claim 3, wherein each of said connecting portions has a shaft in a middle thereof.

* * * * *